Sept. 27, 1938.　　F. L. O. WADSWORTH　　2,131,241
FABRICATING GLASS MACHINE AND METHOD
Filed Oct. 24, 1934　　7 Sheets-Sheet 1
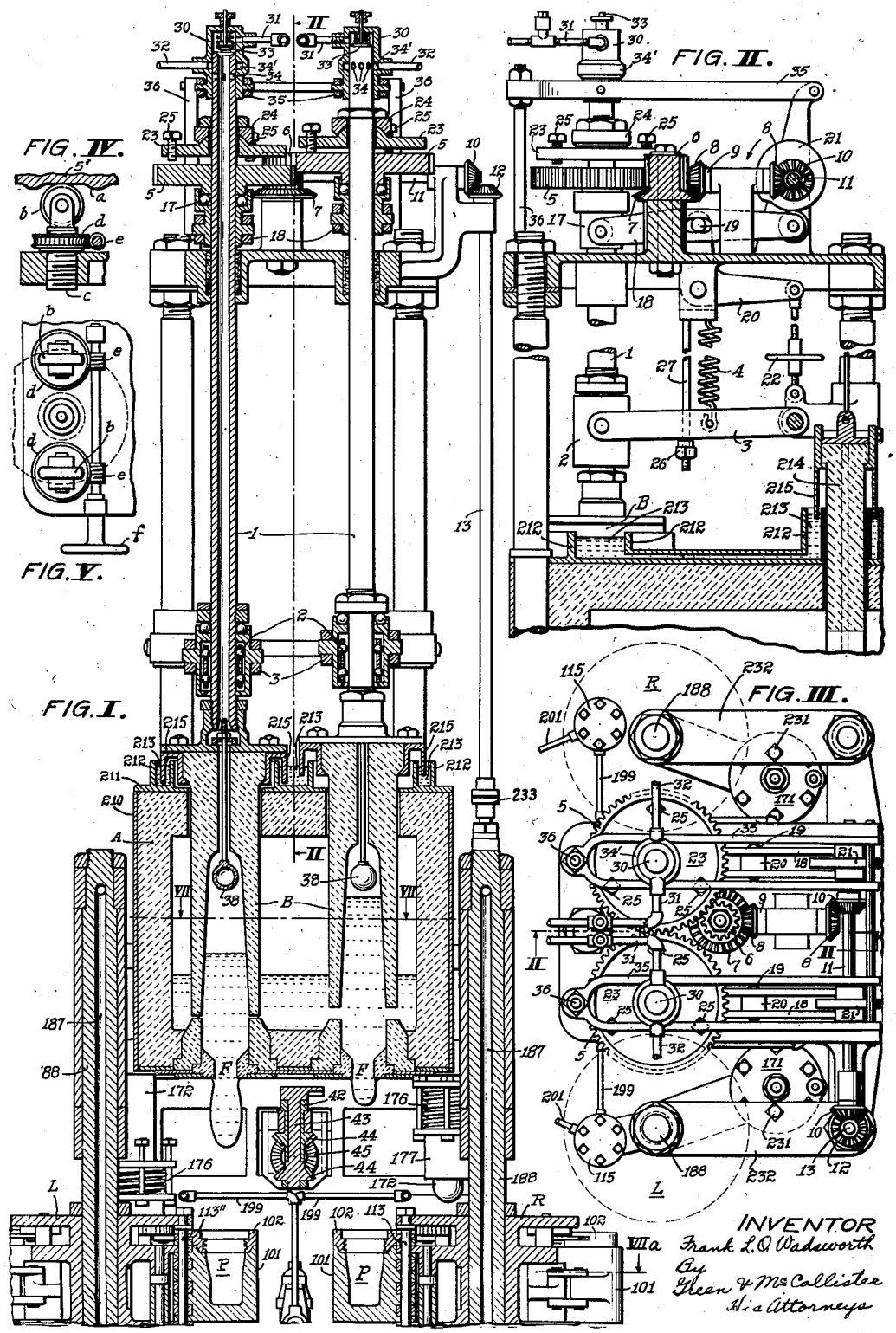

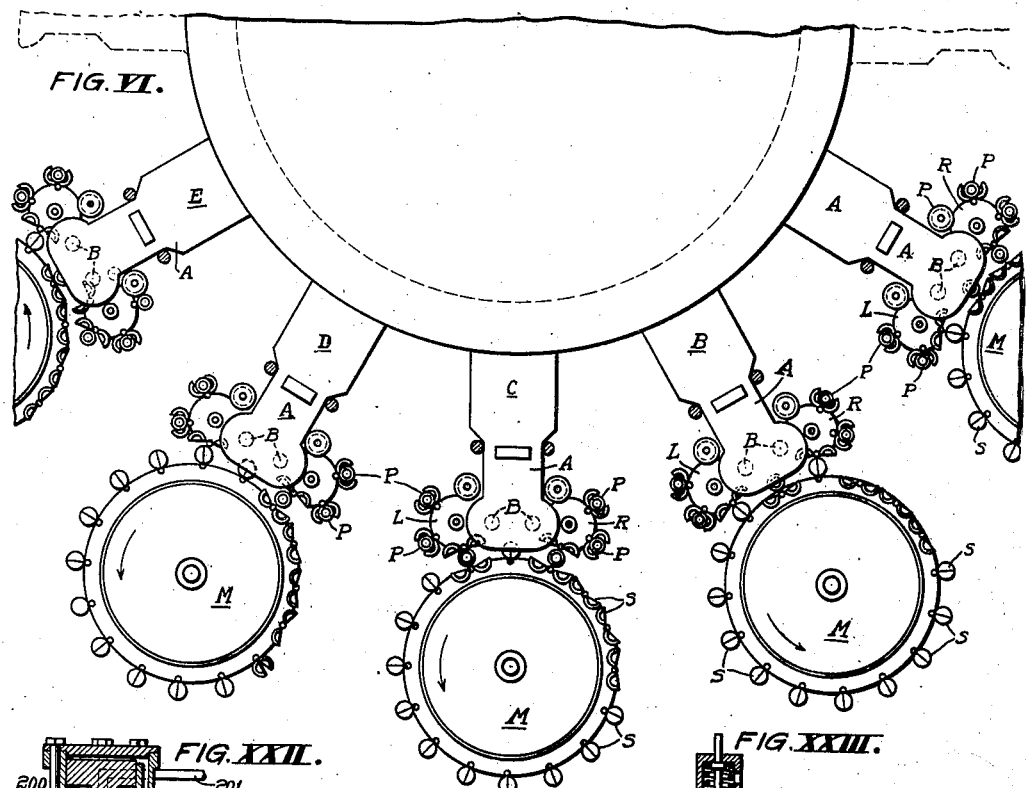
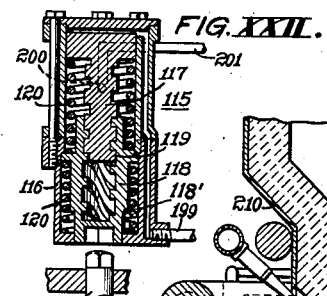
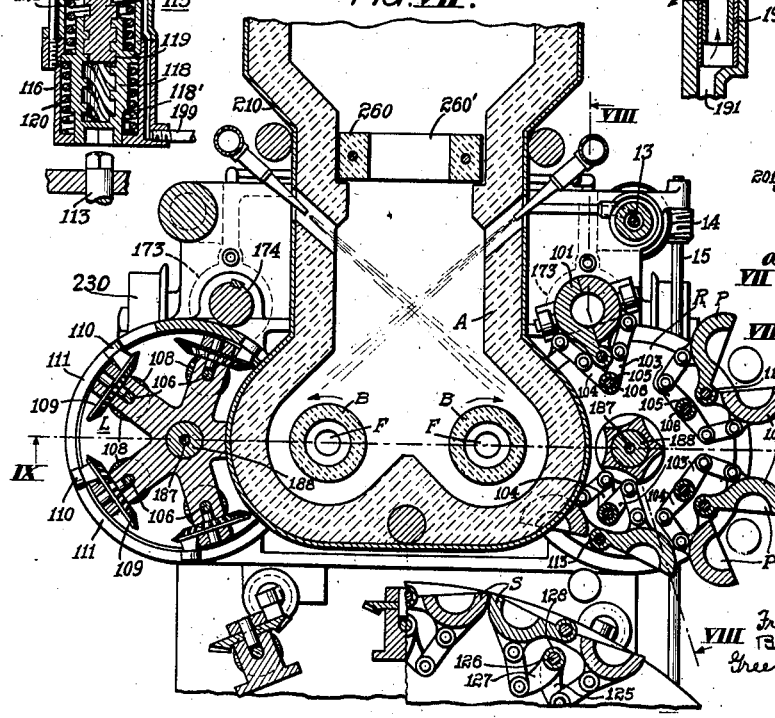

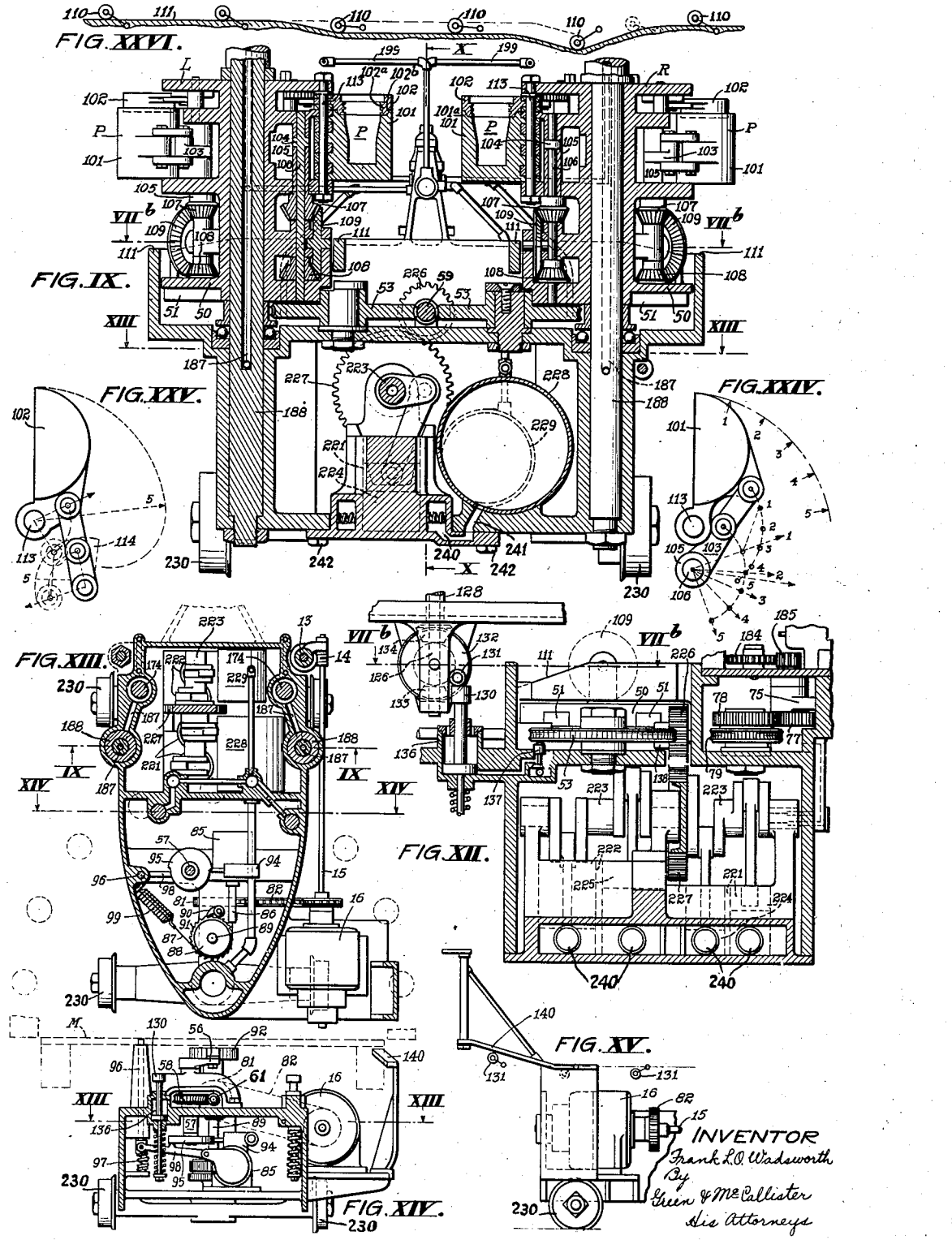

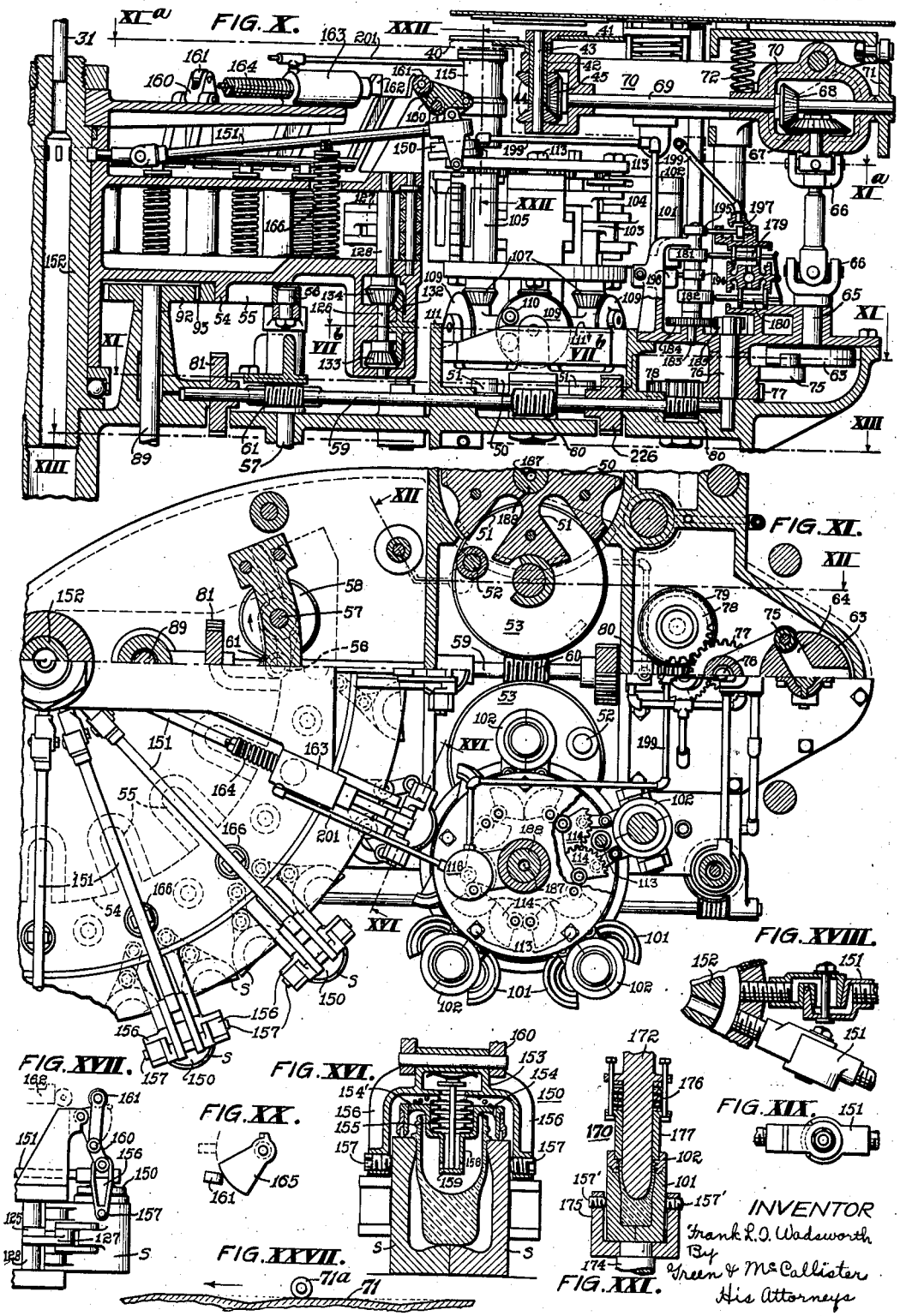

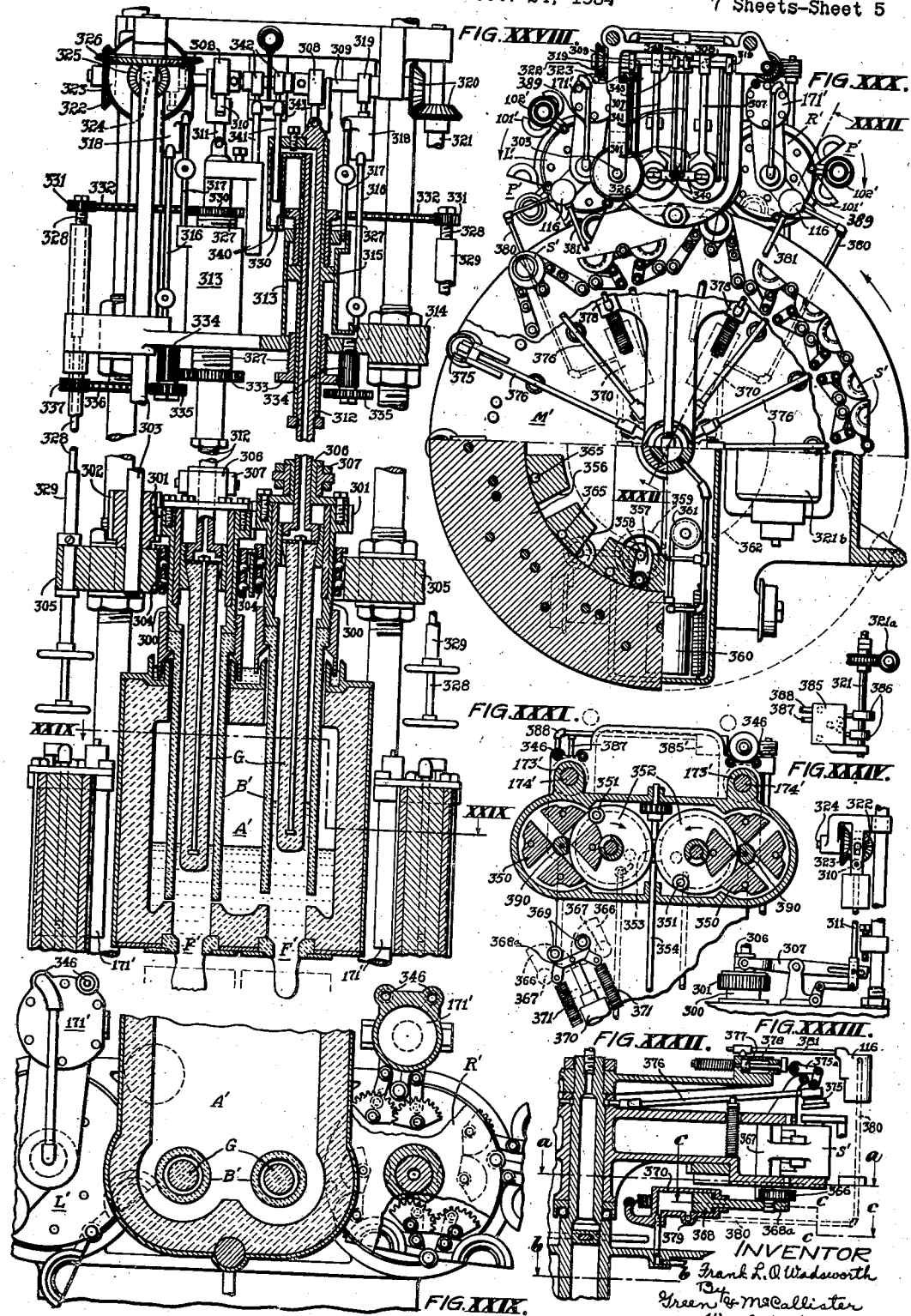

Sept. 27, 1938. F. L. O. WADSWORTH 2,131,241
FABRICATING GLASS MACHINE AND METHOD
Filed Oct. 24, 1934 7 Sheets-Sheet 6
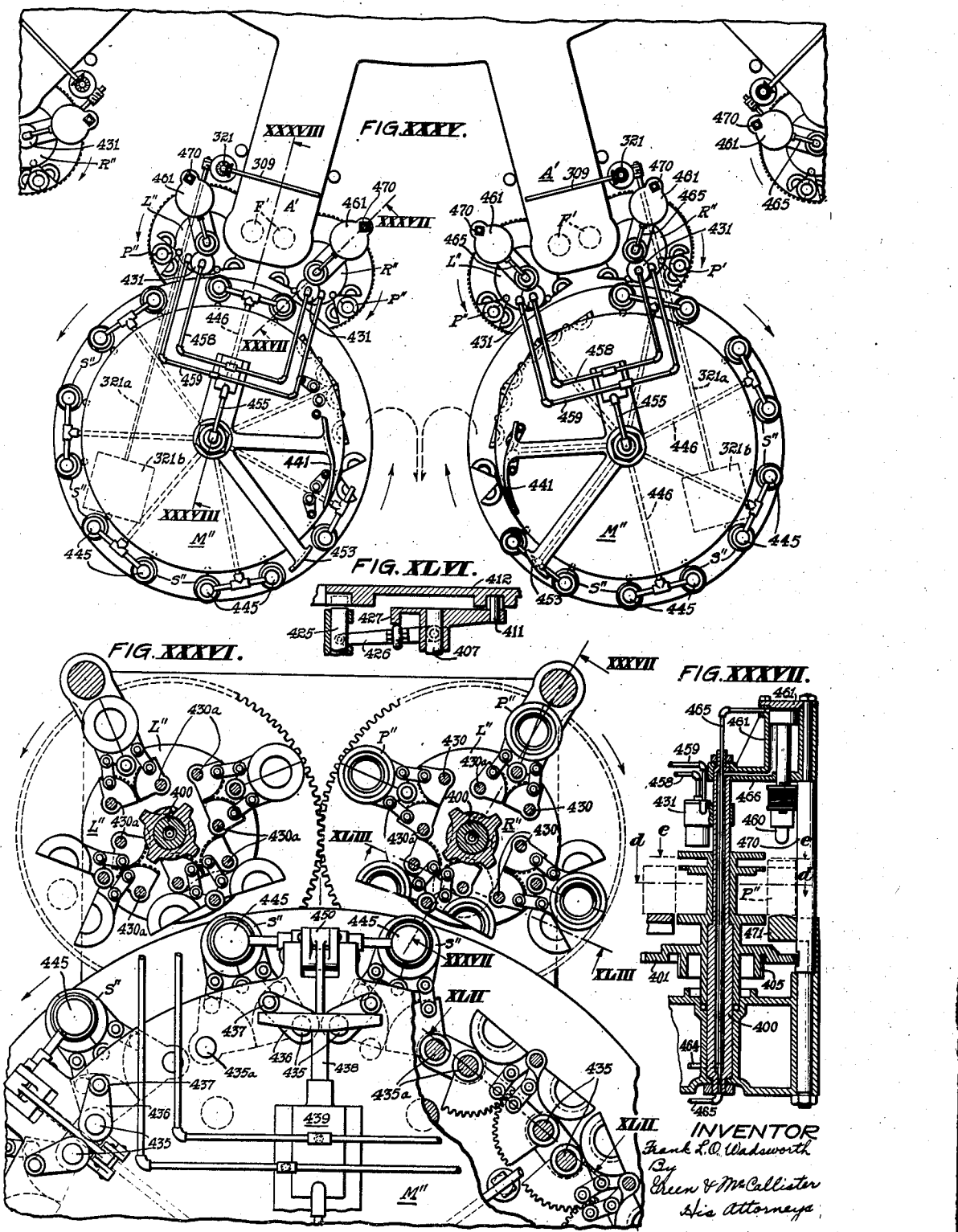

Sept. 27, 1938.                F. L. O. WADSWORTH                2,131,241
                    FABRICATING GLASS MACHINE AND METHOD
                         Filed Oct. 24, 1934        7 Sheets-Sheet 7
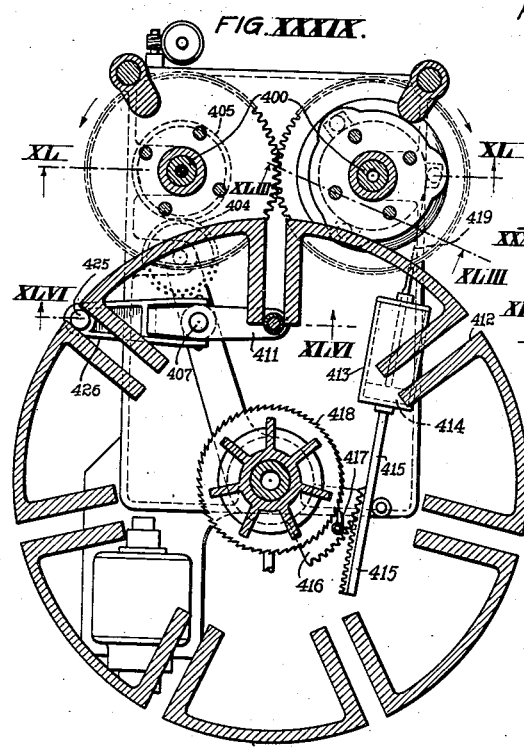
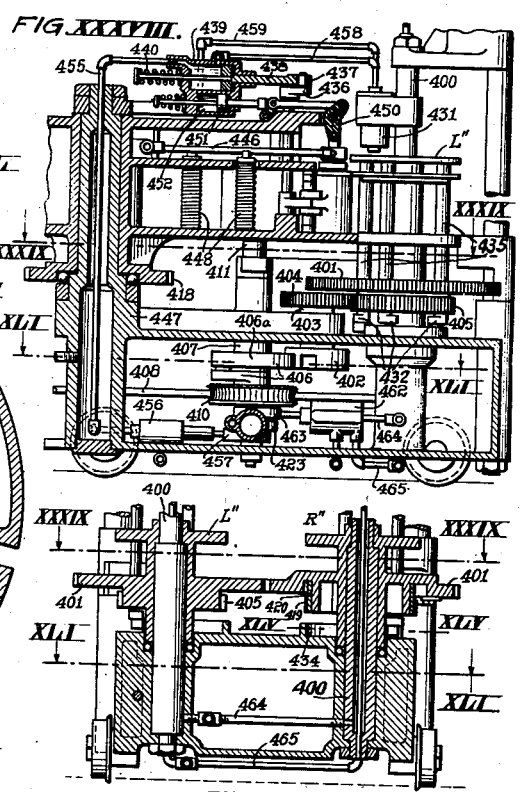
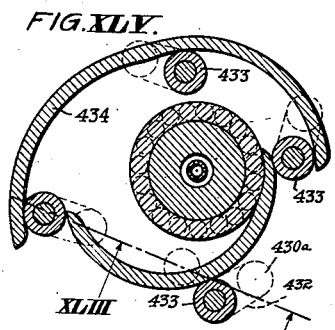
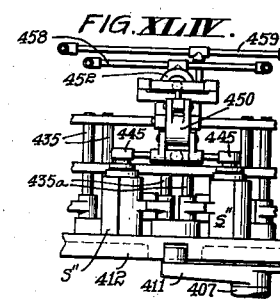
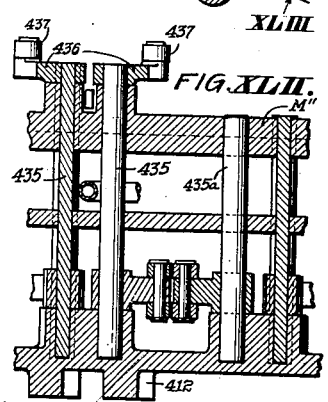
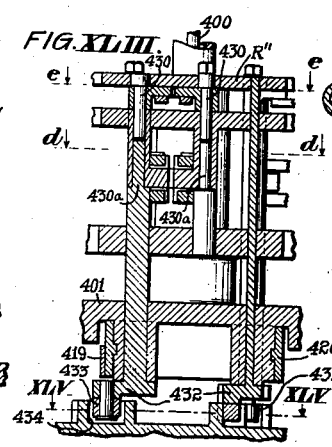
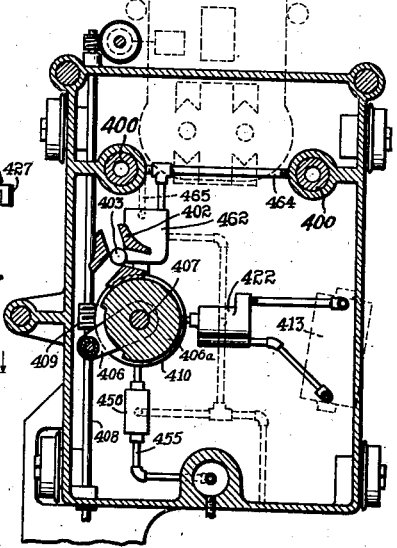
INVENTOR
Frank L. O. Wadsworth
By Green & McCallister
His Attorneys Patented Sept. 27, 1938

2,131,241

UNITED STATES PATENT OFFICE 2,131,241

FABRICATING GLASS MACHINE AND METHOD

Frank L. O. Wadsworth, Pittsburgh, Pa., assignor to Ball Brothers Company, Muncie, Ind., a corporation of Indiana Application October 24, 1934, Serial No. 749,731

38 Claims. (Cl. 49—5)

My invention relates to a new type of twin or dual orifice feeder in combination with a three table forming machine which is designed and adapted to a speed of operation which is much greater than that of any of the existent forms of individual feeder apparatus, and which is commensurate with that of the largest multiple arm feeding machines.

The primary object of my invention is, therefore, to very materially increase the output of the maximum number of feeding machines which may be used in connection with the usual form of melting furnace, and, in conjunction with this purpose, to also substantially reduce the floor space required for each machine, so that a larger number of forming units may be assembled in the space available for their installation. The combined results of increasing the number of feeders and forming machines is to very greatly augment the possible production of fabricated ware from a tank of any given size, which usually has, a melting capacity substantially in excess of that of the forming machine equipment that can be installed in front of it.

Other attendant objects and purposes of the present invention—which presents a number of special features of operation and of structure—will be made apparent, to those skilled in this art, by the following description of various alternative exemplifications and embodiments of my improved combination of feeder and forming mechanism, which are illustrated in the accompanying drawings, in which:

Fig. I is a transverse sectional elevation on the plane passing through the two orifices of one of my new feeders;

Fig. II is a partial longitudinal central section thereof, on the plane II—II of Fig. I;

Fig. III is a plan view of this feeder construction;

Figs. IV and V are respectively vertical section and plan views of a modification of part of the structure of Figs. I, II and III;

Fig. VI is a small scale diagrammatic plan view of a group of five dual orifice feeders, of the form illustrated in Figs. I to V, and of a corresponding number of my three table forming machines for each feeder, arranged in front of a round nosed tank;

Fig. VII is a composite horizontal section through the forehearth of the feeder shown in Fig. I (on the plane VII—VII of that figure), and through a portion of the subjacent forming mechanism (on the planes VII$^a$ of Fig. I, and VII$^b$ of Figs. VIII, IX, X and XII infra);

Fig. VIII is a reduced sectional elevation on the bent plane VIII—VIII of Fig. VII—o. a part of one of the press tables of the combination;

Fig. IX is a cross-sectional elevation on the plane IX—IX of Fig. VII (the sectional plane of Fig. I), of a part of the forming mechanism which is below the bottom of the forehearth;

Fig. X is a longitudinal sectional elevation, on the plane X—X of Fig. IX, of other portions of the forming mechanism;

Fig. XI is a composite plan view on the two level plane XI—XI, and the three level plane XI$^a$—XI$^a$ of Fig. X;

Fig. XII is a reflected (mirror) vertical section on the bent plane XII—XII of Fig. XI;

Fig. XIII is a sectional plan view on the plane XIII—XIII of Figs. IX and X;

Fig. XIV is another reflected sectional elevation on the plane XIV—XIV of Fig. XIII;

Fig. XV is a semi-diagrammatic side view of a part of the structure shown in Figs. XIII and XIV;

Fig. XVI is an enlarged vertical section through one of the blow molds—on the plane XVI—XVI of Fig. XI;

Fig. XVII is a side view of this mold and its actuating mechanism;

Figs. XVIII and XIX are respectively a sectional plan and elevation of a part of the pipe connection thereto;

Fig. XX is a plan view of a device for unlocking the blow head when the blowing operation is completed;

Fig. XXI is a fragmentary sectional view of one of the parison molds and of the press plunger cooperating therewith;

Fig. XXII is an enlarged vertical section, on the plane XXII—XXII of Figs. VIII and X, of a part of the neck ring actuating mechanism;

Fig. XXIII is another enlarged vertical section of the automatic valve control of the press cylinder;

Figs. XXIV, XXV, XXVI and XXVII are diagrams of lever and cam track elements which form a part of the operative mechanism;

Fig. XXVIII is a transverse cross section—similar to Fig. I—through a second form of my new dual orifice feeder;

Fig. XXIX is a sectional plan view on the two level plane XXIX—XXIX of Fig. XXVIII (with a portion of one of the press table decks broken away to show a part of the neck ring actuating mechanism);

Fig. XXX is a partial plan, and composite sectional, view of the feeder shown in Fig. XXVIII, and of the forming mechanism used in combination therewith; the upper portion of this figure showing the horizontal relationship of the main elements of the assembly with a portion of the upper deck of the blow mold table broken away, and the lower left and right hand portions showing the remaining parts of the blow mold table in section on the respective planes a—a and b—b of Fig. XXXII infra;

Fig. XXXI is a partial sectional plan view on the two level plane c—c—c—c of Fig. XXXII;

Fig. XXXII is a vertical section on the plane XXXII—XXXII of Fig. XXX supra;

Figs. XXXIII and XXXIV are side views of parts of the construction illustrated in Figs. XXVIII and XXX;

Fig. XXXV is a semi-diagrammatic plan view of another group of forming machines, each one of which is designed and adapted for use in combination with a dual or double orifice feeder of the character shown in Figs. XXVIII and XXIX;

Fig. XXXVI is an enlarged plan and composite sectional view of a part of one of these forming machines, and upper left and right hand sections being taken respectively on the planes d—d and e—e of Figs. XXXVII and XLIII infra;

Fig. XXXVII is a partial vertical section (similar to that of Fig. VIII) on the plane XXXVII—XXXVII of Figs. XXXV and XXXVI;

Fig. XXXVIII is a longitudinal sectional elevation on the plane XXXVIII—XXXVIII of Fig. XXXV.

Fig. XXXIX is a horizontal section on the plane XXXIX—XXXIX of Figs. XXXVIII and XL;

Fig. XL is a transverse sectional plan view on the plane XL—XL of Fig. XXXIX;

Fig. XLI is a sectional plan view on the plane XLI—XLI of Figs. XXXVIII and XL;

Fig. XLII is a vertical section on the plane XLII—XLII of Fig. XXXVI;

Fig. XLIII is another vertical section on the plane XLIII—XLIII of Figs. XXXVI and XXXIX (see also Fig. XLV infra);

Fig. XLIV is a front elevation of the pair of blow molds at the center of Fig. XXXVI;

Fig. XLV is an enlarged horizontal section on the plane XLV—XLV of Figs. XL and XLIII; and Fig. XLVI is a vertical section on the plane XLVI—XLVI of Fig. XXXIX.

In general my improved apparatus for forming molten glass into individual mold charges and then shaping those charges into finished articles of commerce includes a forehearth structure which is attached to the front end of a suitable glass melting tank or furnace and having dual or multiple orifices therein with means associated with each orifice for establishing continuously flowing streams of molten glass therethrough composed of a series of regularly recurrent sections of enlarged diameters connected together by sections of reduced diameters that are adapted to be severed at these points of reduced diameters into individual mold charges. The feeding means are so arranged that an enlarged portion of one stream is being formed while a portion of reduced size is being formed in the other stream, and mechanism is provided for alternately severing these streams into individual preshaped mold charges which are delivered to a three table forming machine where the charges are shaped to their finished form. The forming machine is composed of two press molds, one of which is positioned under each orifice to receive the mold charges severed from the stream of molten glass issuing therethrough and a blow or finishing mold which receives the pressed blanks from the press molds and in which the final shaping of the blank is completed. The feeding apparatus, the severing mechanism and the molds of the forming machine are all operated in synchronism with each other and are so timed that a mold charge is delivered to the mold of one press table while a charge in a mold of the other press table is being pressed into a blank and the pressed blank is delivered to a mold of the blow table at the same time that another charge is delivered to a mold of that press table.

Referring to the drawings in detail, in the embodiment of my invention illustrated in Figs. I to XXVII, inclusive, the feeder comprises an I-shaped forehearth A, having a pair of delivery orifices F—F at the front end, over which a pair of vertically reciprocable bells B—B are positioned that are adapted to be periodically, but alternately, moved up and down to effect the segregation and delivery of preformed mold charges in alternate succession from the two orifices. Each bell B—B is detachably secured to the lower end of a hollow shaft 1, which is rotatably mounted in a ball bearing race 2, that is carried on the outer end of a twin arm radius guide 3, and is partially counter-balanced by an adjustable tension spring 4. The upper portions of the hollow bell shafts 1—1 are encircled by large spur gears 5—5 which are in engagement with each other and which are driven by an elongated pinion 6 that permits the gears to have a considerable range of vertical movement on the shafts 1—1. The pinion 6 carries a bevel gear 7, which is connected through miter gears 8—8, on shaft 9, miter gears 10—10, on cross shaft 11, miter gears 12, on vertical shaft 13 and worm 14 with the drive shaft 15 of motor 16 (Fig. XIII). These gears 5—5 are not directly connected to the bell shafts 1—1, but are rotatably carried on end thrust ball bearings 17—17, which are supported by pivoted levers 18—18 that may be rocked up or down on adjustable fulcrum pins 19—19 carried by pivoted bell cranks 20—20, by cams 21—21 on the cross shaft 11 shown at the right of Figs. II and III. A hand operated turnbuckle 22 is connected to each of the bell cranks 20 so that the position of the fulcrum pins 19—19 may be readily varied independently of each other. The upper ends of the bell supporting shafts 1—1 carry large disc heads 23—23, which are operatively connected thereto by splined ball and socket joints 24—24, and which are each provided with three adjustable contact screws 25—25—25, that are adapted to engage the adjacent upper surface of the corresponding spur gear 5—5, when the latter is lifted by the action of the lever-cam elements 21—19—18—17, previously mentioned. The cams 21—21 are so designed that the spur gears 5—5 are lifted alternately into engagement with the corresponding disc head 23 and when this engagement occurs the bell shaft support 23 is raised, and is concurrently rotated by the continuously driven pinion 6 which is driven from the motor 16 through the gear train, above described; the speed of rotation being determined in part by the viscosity of the glass in which the lower end of the bell is immersed and in part by the amount of unbalanced weight which is supported by the lifted gear wheel 5. The range of upward movement of each bell is regulated and controlled by the adjustment of the fulcrum pin support 19 for lifting lever 18; and the limit of downward movement is fixed by adjustable stop nuts 26—26 on the end of rods 27—27, which engage the lower side of the radius arm guides 3—3 for the lower ball bearings 2—2.

The extreme upper ends of each of the hollow bell shafts 1—1 are covered by grooved cups 30—30 whose upper portions are connected to pressure supply pipes 31—31, and whose intermediate grooved portions 34' are connected to vacuum conduits 32—32. The closed end of each cup 30 is provided with an adjustable check valve 33, which seats on the end of the hollow bell shaft 1 when the latter is raised to a predetermined height and thus cuts off the connection between the pressure supply pipe 31 and the bell or segregation chamber B; and the side wall of this shaft is pierced with a row of narrow slots 34, which are so located that when the shaft is moved upward, a connection will be established between the vacuum groove 34' in the cap and the said chamber. Each cup 30—30 is carried by a U-shaped yoke 35—35, which is pivoted, at its rear end, on the frame of the feeder assembly and is adjustably supported at its front end on a vertical pin 36; so as to vary the time and the degree of opening of the bell chamber to the vacuum connection. The cooperating adjustments of the range of upward movement of the bell shaft 1 through the adjustment of fulcrum pins 19, the set position of the pressure check valve 33. and the height of the cap 30, permits of the establishment of any desired relationship between the up and down movement of the bell and the alternate opening and closing of the bell chamber B to the pressure and vacuum lines 31—32.

If the mold charges are relatively small in volume, and the depth of the glass in the forehearth is relatively large, the feeder may be operated without the use of the vacuum connection; and in such a case the grooved portion of the bell shaft cap 30 is open to the atmosphere. But if the mold charges are relatively large, or if the bath of glass in the forehearth is relatively shallow it is desirable to use a vacuum (of the proper degree) to expedite the recharging of the segregation chamber at each upward movement of the bell B; and in order to reduce the time of such recharging to a minimum (and thus increase the speed of the operation) I preferably use a low sub-atmospheric pressure (i. e., a high vacuum), and prevent any overcharging action by the provision of a hollow ball float valve 38, made of nichrome, stainless steel, or other suitable material, not injuriously affected by contact with molten glass, which floats upwardly as the level of glass rises in the segregation chamber, and closes communication between that chamber and the hollow shaft 1, thereby preventing the glass from being drawn.

It will be observed that the external force, to which the glass is subjected during the accelerated delivery period—while the glass is being expelled from the delivery orifice under the joint action of gravity and of super-atmospheric pressure—is not released or relieved, that is, the valve 33 does not seat over the upper end of the hollow shaft 1 until the bell has been raised to a substantial height sufficient to establish a free open communication between the interior of the bell B and the surrounding forehearth, and as a result, any retractive action on the outflowing glass—due to the upward movement of the bell— is eliminated. Further, since the slots 34 do not register with the groove 34' in the cup 30, until bell B and shaft 1 have been lifted to substantially the upper limit of their travel, the vacuum (when used) is not applied until the area of the communicating opening between the main body of glass in the forehearth and the interior of the bell is much greater than that of the delivery orifice F; and under such circumstances the flow of glass into the segregation chamber is much more rapid than its outflow through the orifice under the gravity head above it. There will, therefore, be a natural "necking" of the outflowing stream during the period of unrestrained gravity flow, but no retraction or interruption of its continuous flow.

The cutting off of each successively formed mold charge, at the proper time (preferably at the points of natural "necking"), is effected by a shear mechanism which is so designed as to operate alternately on the two streams from the dual orifice feeder. This shear mechanism comprises two shear blades 40—41 (Fig. X), which are mounted on two vertical coaxial shafts 42—43, that are rotated synchronously in opposite directions by a pair of opposed mitre gears 44—44, one of which is secured to each of the shafts 42—43 and an intermediate driving pinion 45. The axis of the shear blade shafts 42—43 is positioned midway between the centers of the two delivery orifices F—F, and these shafts are periodically and intermittently revolved through 180 degrees to effect the severing operation through a train of gears hereinafter described. One-half revolution causes the oppositely moving shear blades 40—41 to cross each other under the center of one delivery orifice—and thus sever the stream flowing therefrom; and the succeeding half revolution causes the blades to cut through the center of the stream flowing from the other delivery orifice. At the time of each cut the shear blades 40—41 are also moved downward, at a speed greater than that of the flowing glass, so as to prevent any retardation of the flow, and also accelerate the delivery of the severed charge to the receiving mold. The mechanism for imparting this downward movement to the shear blades 40—41 will be more fully disclosed later in connection with the description of the forming mechanism.

*Forming mechanism*

The mechanism for shaping the mold charges into articles comprises two press mold tables R and L positioned symmetrically on the two sides of the forehearth A; and a single blow mold table M positioned directly in front and between the axes of the two press tables. Each of the press tables R and L carries five equally spaced parison or blank molds P, and these tables are alternately moved in opposite directions through one-fifth of a revolution, by means of Geneva wheels 50—50 each having five slots 51 therein (see upper part of Fig. XI) and the interval of rest of each wheel is 0.7 and the interval of action is 0.3 of each revolution of its driving pin 52 which is mounted on the face of a driven gear 53. The blow mold table M carries sixteen, equally spaced blow molds S (see Fig. VI) and is periodically moved through 22.5 degrees by a Geneva wheel 54 having sixteen external slots 55 therein (see Fig. XI), whose interval of rest is 0.5625, and whose interval of action is 0.4375 of each rotation of its actuating crank pin 56, which is secured to one end of a vertical shaft 57 having a worm gear 58 keyed to its opposite end. These three Geneva movements 50—50—54 are synchronously driven by a single shaft 59, which extends longitudinally of the machine, and has worms 60—61 secured thereto which mesh with the gears 53—53 and 58, respectively. This shaft 59 also serves to operate the shear blades 40—41 through a Geneva wheel 63 having three external slots 64, which is secured to a vertical shaft 65 having universal joints 66 therein, and which is geared to a shaft 69 carrying the driving pinion 45 by the bevel gear and pinion 67—68. The shaft 69 is journaled in a pivoted frame 70 that supports the blade carrying shafts 42—43 and a down movement is imparted to the shear blades during the severing operation by a cam 71 secured to the outer end of the shaft 69, which bears against a roller 71ᵃ that is carried by the main frame of the machine. A spring 72 normally resists such movement (see right hand end of Figs. X and XI). The interval of action of the Geneva wheel 63 is only one-sixth, and its interval of rest is five-sixths of the period of revolution of its driving crank 75 which is secured to a vertical shaft 76 that is geared to the drive shaft 59 by the worm and gear elements 77—78—79—80. The central driving shaft 59 is preferably rotated at a high speed by means of the variable speed motor 16, which is located at one side of the machine and is coupled to a sprocket and wheel 81 on said shaft by a silent chain drive 82 (see Fig. XIII); and the crank pin elements 52—52—56—75 of the several Geneva movements 50—50—54 and 63 are operatively connected with this shaft (through the gearing heretofore described) in such manner that the elements 56—75 which move the blow mold table M and the shear blades 40—41 revolve at twice the speed of the elements 52—52 which operate the two press mold tables R. and L.

In order to relieve or reduce the work which is imposed on the Geneva movement 54 that operates the large and heavy blow mold assembly M, I provide an auxiliary pneumatically operated mechanism which is automatically brought into action at the instant when this assembly begins to move, and which supplies the major portion of the power required to effect this movement. This auxiliary mechanism comprises a pressure cylinder 85 whose piston rod 86 is connected to a flexible strap 87 that engages and partially encircles a revolvable drum 88, which is in turn coupled to a vertical driving shaft 89, by one way pawl and ratchet wheel elements 90—91; and a driving pinion 92 on the upper end of said shaft which engages with an internal gear 93 on the blow mold table M (see Figs. X, XIII and XIV). A suitable fluid under pressure (e. g., compressed air) is admitted to the auxiliary cylinder 85 by means of a valve 94 that is actuated by a cam 95 on the lower end of the Geneva crank shaft 57, at the instant when the crank pin 56 enters one of the slots 55 on the blow mold table M; and the resultant movement of the auxiliary piston member 86 rotates the table in the required direction at a speed which is controlled by the Geneva movement 54 itself. The valve actuating cam 95 also serves to withdraw a vertically movable locking pin 96 normally pressed upwardly by spring 97 into engagement with the blow mold table M, (see Figs. XIII and XIV), by depressing a pivoted lever 98, which is attached to the lower end of the pin 96, and leave the latter free to rotate through one-sixteenth of a revolution, at the end of which the table is brought to rest by the Geneva movement and again locked in position; the auxiliary cylinder valve 94 being concurrently or subsequently closed to allow the compressed fluid to escape from the said cylinder 85, and the piston element 86 thereof to be retracted to its initial position by the return spring 99 on the drum strap 87.

Each of the parison or blank molds P of the press tables R—L comprises the usual divided bottom section 101 and the divided top section 102 which are journaled on a common vertical shaft 113. The lower bottom sections and the top neck ring sections are operated independently of each other in the usual manner, the bottom sections 101 being operated by twin crank arm elements 103—104 which are connected to the separable lower sections of each parison mold and extend outwardly from coaxial shafts 105—106 which are concurrently revolved in opposite directions by opposed bevel pinions 107—108 and intermediate bevel gear 109. The bevel gear 109 is rotated alternately in a clockwise and counterclockwise direction (as viewed in Fig. X) to close and open the two halves of the mold 101 by a cam roller 110 which is carried by the gear 109 and engages a track element 111 shown in Figs. VII, XI (left hand portion X and XXVI). One part of each of the divided top ring sections 102 of each of the parison molds P is keyed to the shaft 113 while the other is loosely journaled thereon and both sections are coupled together through the gear segments 114—114 (Figs. IX, X, and XI) so that when one section of the mold is turned in one direction the other section will turn simultaneously in the opposite direction. The neck ring molds are opened by a vertical plunger mechanism 115 which is periodically brought into engagement with and rotates the shaft 113. The plunger mechanism (Fig. XXII) comprises a cylinder 116 containing a pair of male and female piston elements 117—118 which are interconnected by multiple screw threads 119 of relatively high pitch. When pressure is admitted to the upper end of this cylinder, the pair of interconnected pistons 117—118 are moved downwardly as a unit until the socket end of the female member 118 is moved into engagement with the head of one of the neck ring shafts 113 and the shoulder 118′ comes in contact with the lower end of the enclosing cylinder 116. The male piston member 117 then moves downwardly relative to the member 118 and causes the latter member to rotate and turn the shaft 113. Since the divided neck ring sections are geared together through the segments 114—114 and since one of these sections is keyed to the shaft 113, it is apparent that on rotation of the shaft by the mechanism 115 the neck sections 102 will be opened. When the motive fluid is exhausted from the cylinder 116 the parts 117—118 are returned to their initial positions by springs 120 within the cylinder 116.

The neck ring sections 102 are closed simultaneously with the bottom body section 101 of the parison molds by the engagement of the upper ends of the body sections of each parison mold with a depending flange 102a on the bottom of each neck ring section. The flanges 102a extend into the mold cavity formed between sections 101, and each is provided with a beveled face 102b which is engaged by a corresponding beveled face 101a on the inner face of each of the lower sections 101. Consequently, the lower sections and neck ring sections of each parison mold are closed simultaneously by the mechanism closing the lower sections but are opened at different times through the mechanism heretofore described.

The separable halves of each blow mold are operated by a mechanism which is, in all essential respects, the same as that employed in operating the lower sections 101 of the parison mold P with one section of each blow mold connected to the crank arm 125 on a shaft 126, while the other section is linked to the crank arms 127 on a shaft 128 coaxial with the shaft 126. This mechanism, which is operated to close the blow mold sections when the supporting table M is at rest, is actuated by means of a vertically movable plunger 130 which, when lifted, engages a roller 131 on an intermediate bevel gear 132 disposed between bevel pinions 133—134 on the shafts 126—128, and thus rotates the latter through the required angle (see Figs. XII and XIV). There are two of these actuating plungers 130, located at the right and left hand sides of the machine (see Fig. XIII) in such position as to respectively close the then stationary blow molds at the points where they stop to receive the pressed parisons from the two blank mold tables R—L (see Fig. VI). The plungers 130 which are mounted in cylinders 136 are raised by the admission of motive fluid (e. g., compressed air) to the bottom of the cylinder in which they work; this admission, and subsequent exhaust, being controlled by two way poppet valves 137 that are actuated by cams 138 on the lower face of the worm wheel 53—53 that form a part of the Geneva movements, of the two press mold tables R—L. The blow molds are opened, while the supporting table therefor is in movement, by the engagement of the lifted gear rollers 131 with the under side of an inclined track 140 positioned just in advance of the discharge station for the finished articles (see Figs. VI, XIV and XV).

Each blow mold S is provided with its own blow head 150, which is mounted on a vertically swinging pipe arm 151 that also serves to supply the blowing air from the central distributing head 152 around which the blow mold table M revolves. These blow heads 150, which are adapted to be moved vertically into sealing and unsealing position with the mold S, comprise two relatively movable members 153—154 which are connected by a flexible Sylphon bellows 155 (see Fig. XVI); and the upper member 153, which is rigidly secured to the swinging pipe support 151, is provided with two downwardly projecting arms 156—156 that carry adjustable contact screws 157, which are adapted to tightly engage the opposite sides of the closed mold sections S when the head 150 is moved downwardly and lock the parts together during the blowing operation. The lower member 154 which first engages the top of the blow mold S when the blow head 150 is moved down, is provided with a tubular extension 158, whose lower end is normally closed by a check valve 159 that is carried by the upper member 153 and is unseated—to admit air from the swinging pipe connection 151 to the interior of the pressed blank—when the blow head 150 has been forced down to its locked position. In order to effect this downward movement of the blow heads 150 I provide a bell crank link mechanism 160, one arm of which is connected to the upper member 153 of the head, and the other arm of which carries a roller 161 that is adapted to be engaged and the bell crank 160 turned to dead center by the adjacent end of a horizontally reciprocable plunger 162, which is mounted in a cylinder 163. This plunger 162 is moved outwardly—to rock the bell crank lever 160 downwardly and thus lower the blow head 150—by admitting compressed air to the rear end of the cylinder 163, and is moved back, when the air pressure is released, by means of a return spring 164. There are two of these plunger mechanisms 162—163, which are symmetrically positioned on each side of the center line of the forming machine, and which are adapted to operate alternately in closing and locking down the blow heads 150 on the blow molds S as soon as the latter have received the pressed parison blanks from one or the other of the press mold tables R—L; and this closure is also effected when the blow mold table is at rest. The blow heads 150 are unlocked and raised, when the blow mold table is in movement by a rocking sector cam 165 (see Figs. XV and XX), which engages with the roller 161 at the upper end of the bell crank lever 160—and moves the latter out of its dead center locked position (and simultaneously disengages the arms 156 on the blow head 150 from the sides of the blow mold S), just before the blow molds S are opened to discharge the finished product from the machine. Compression springs 166 disposed below the swinging arms 151 also assist in raising the blow heads 150.

A characterizing feature of the blow head illustrated in Fig. XVI is that it provides for a circulation within the mold cavity during the blowing operation. In order to accomplish this, the member 154 is provided with one or more vents 154', which are continuously open, but are of such aggregate area that an adequate blowing pressure will be maintained within the blow cavity during the periods that the valve 159 is open.

Each of the press mold table assemblies R—L is provided with a suitable pressing mechanism 170, for forming the parison blanks, which is positioned in line with the axis of the mold P at the first of the five successive stations which it occupies in each complete revolution of the table (Figs. VIII—XXI). In the construction here shown each pressing mechanism 170 comprises both an upper and a lower cylinder-piston assembly 171—172 and 173—174. The lower piston rod 174 is provided with a forked head 175, which, when raised, engages both the bottom and the sides of the parison mold sections 101, and not only locks them together, while the upper press plunger 172 is acting on the glass, but also relieves any downward strain on the supports for the mold during this operation. In order to ensure a close engagement between the arms of the head 175 and the mold sections I provide each arm with an adjustable contact arm 157' and thus provide effective locking means which positively hold the molds closed during periods of maximum strain.

The press plunger 172 is provided with the usual spring controlled neck ring sleeve 176—177 which confines the glass in the mold and forms the upper edge of the pressed parison blank.

In order to admit motive fluid at the proper intervals to the cylinders 171—173 of the two pressing mechanisms, I provide a pair of double-acting two way "timer valves" 179—180, which are operated, in the proper sequence, by a set of cams 181—182 mounted on a shaft 183 that is revolved, at the same speed as the worm-wheel crank-pin-shafts 60—53—52 of the Geneva drive wheels 50 for the press mold tables R—L, i. e., at one-half the speed of the Geneva crank arms 56 and 75 for the blow mold table M and the shear blades (see Figs. X and XI), from the shaft 76 operating the shear mechanism through the gears 184—185. One of the delivery outlets of each of these "timer valves" 179—180 is directly connected to a passageway 186 leading the lower end of one of the mold supporting cylinders 173, and the other is connected to a connected system of passageways 187 in the tubular posts and cross arms 188—189 which serve as a support for the adjacent press tables R—L and press cylinder 171—173 (see Fig. VIII). When motive fluid is admitted to the first mentioned connection, i. e., passageway 186, it raises the mold supporting piston 174, and as this moves upwardly, it uncovers a side port 190 in the cylinder 173, which is in communication with the upper end of the associated pressing cylinder 171 (through the piping 191 and a two way spring pressed check valve 192 shown in Figs. VIII and XXIII). The flow of motive fluid entering the piping 191 through this side port 190 raises this check valve 192 and forces the upper press plunger 172 and neck ring collar 177 down into the parison mold, which is now supported and locked in position by the lifting of the lower plunger 174 to the top of its cylinder 173. When either the timer valves 179—180 for each press assembly is moved to the other end of its stroke, the connection to the lower end of the hollow cylinder 173 is opened to the atmosphere; and the resultant drop of pressure therein permits the spring pressed check valve 192 (Fig. XXIII) to move downward and also open the top of the press cylinder 171 to the outer air. At the same time motive fluid is admitted to the system of pasageways 187 leading to the bottom and top of the upper and lower cylinders 171—173 thereby positively returning the opposed plungers 172—174 to their initial position, and leaving the associated press mold table R—L free to be moved through another step.

The timer cam shaft 183 through the cams 195—196 also serves to actuate a pair of single acting two way valves 197—198 which control the flow of motive fluid through pipes 199 leading to the upper ends of the operating cylinders 116 for the neck ring elements 102 of the press mold assemblies R—L. When one of these valves 197—198 is moved to open the associated cylinder 116 to the source of pressure, the male and female piston members 117—118 thereof are successively actuated, as already described, to open the neck ring elements 102 of the mold at one or the other of the two transfer positions and thus release the pressed parison blank thereat. As the top piston 117 moves downward it opens a port 200 in the side of the cylinder 116, which is connected through the pipe 201 to the inner end of the cylinder 163 that operates the blowing head 150. The pipe 201 is connected to the cylinder 163 through a check valve like that shown in Fig. XXIII, and when motive fluid is introduced into the pipe 201, the blow head 150 is forced down and locked on the top of the blow mold sections which have just been closed on the released parison blank (as previously described). When the timer valve 197—198 is moved to open the neck ring cylinder 116 to the atmosphere, the release of pressure thereon concurrently opens the check valve on the associated blow head cylinder 163, and the pistons 117—118—162 of these two connected cylinders are returned to their initial positions by the springs 120—164 already described.

Cycle of operation

The continuous or continued cycle of operation of the combined feeding and forming mechanism is as follows: As soon as one mold charge has been cut off and delivered to the mold beneath it—say on the right hand press table R (see Fig. I)—the supporting press table is set in movement to advance the molds thereon by one fifth of a revolution. This carries the last filled mold under the press plunger 172 and the corresponding timer valve 179 is moved to operate this press mechanism (see Figs. VIII and XXI). The previously filled mold P containing a freshly pressed parison blank, is concurrently moved away from pressing position and the lower sections 101 of this mold are partilaly opened (see Figs. VI—A and VII). The mold next in advance is also moved another step without any further change. The second mold in advance is carried to the transfer position, and during this movement the cam track 111 is so shaped that the lower sections 101 thereof are fully opened, while the still closed neck ring 102 (which supports the pressed parison blank) is brought into registry with the axis of an opened blow mold S which has already been moved into this transfer position (see infra) and is now at rest (see Fig. VI—A and Fig. VII). The valve 137 controlling the admission of motive fluid to the lower end of the cylinder 136 is then opened, which causes the plunger 130 to be moved upwardly and close the sections of the blow mold S on the suspended parison blank through the associated gears 132—133—134. The control valve 197 is then actuated and motive fluid is delivered to the mechanism 115 which opens the sections of the neck ring and releases the suspended parison blank (see Fig. VI—B). The movement of the neck ring actuating pistons 117—118, admits motive fluid to the blow head cylinder 163 and moves the plunger 162 against the roller 161 on the crank arm 160 forcing the blow head 150 down into locked position on the mold beneath (see Figs. XI, XVI and XVII). The blow mold table is then started and moves through one stem. This carries the mold which has just received the parison blank from the press mold table R (which is now being blown to form) to an intermediate position between the transfer stations of the R and L tables, and the still opened and unfilled blow mold just in advance to the L transfer position (see Fig. VI—C). While this blow mold table movement is taking place the left hand press mold table L also begins to move and at the end of this last mentioned movement the units of the press mold assembly L have been brought to the same relative positions as those occupied by the units of the press table R at the corresponding step in the cycle (see Fig. VI—C). The successive series of actions of closing the blow mold sections, of opening the neck ring sections, and of closing down the blow head, are now repeated at the transfer station of the mold table L in the same sequence and order as they are performed at the right hand transfer station; and the blow mold table M is then moved through another 22½ degree interval. Just after this movement starts (see Fig. VI—D) the press mold table R is again set in motion, and the two tables R and M continue to move concurrently for a part of the blow mold table movement (see Fig. VI—E); but the movement of the blow mold table M is completed before that of the press mold table R. At the end of the latter movement all of the mold units on all of the tables R—L and M have again assumed the relative positions first described and one complete cycle of operations have been completed.

The relative angular positions of the elements of the two Geneva mechanisms 50—50 which control the alternate movements of the two press mold tables R—L are so adjusted that these movements occur at equally spaced intervals, and in such relation to the feeding and severing operations that each press table begins to move as soon as a mold charge has been delivered to one of the molds which it carries. The desired synchronism of the severing action is obtained by driving all of the Geneva movements 50—50—54—63 (for the tables R—L and M and the shear blade mechanism 40—41) from a common drive shaft 59, and the synchronism between these movements and those of the reciprocating bells B—B of the feeder is secured by gearing the shaft 15 of the driving motor 16 to the system of vertical and horizontal shafts 13, 11 and 9 that control the lifting, lowering and rotative movements of the bell shaft elements (see Figs. I, II, III and XIII).

The order and time sequence of the cooperative successive actions and effects of the combination of feeder and forming machine operations can be more fully understood by considering a specific case in which the apparatus is adjusted to produce sixty finished articles per minute. In that case each of the twin feeder mechanisms will deliver thirty mold charges per minute—or one every two seconds—and the time relation of the successive table and transfer movements will—when the parts are arranged as shown in Figs. I to XXVI—be as follows:

| | |
|---|---|
| At 0.0 second | Charge delivered to mold on press table R (Fig. I) |
| At 0.0 second | Press table R begins to move (blow table M already moving) |
| At 0.3375 second | Blow mold table M movement completed |
| At 0.60 second | Press mold table R movement completed |
| At 0.70 second | Blow mold at transfer station of mold table R closed on parison blank |
| | Press plungers on press mold table R in action to release neck ring sections 102 |
| At 0.80 second | Neck ring sections 102 on press mold table R opened |
| At 0.90 second | Blow head 150 at transfer station locked down |
| At 0.90 second | Blow mold table M starts to move |
| At 1.00 second | Charge delivered to mold on press table L and this table begins to move |
| At 1.3375 seconds | Blow mold table M movement completed |
| At 1.60 seconds | Press mold table L movement completed |
| At 1.70 seconds | Blow mold S at transfer station of mold L closed |
| | Press plungers on press table L in action to open neck ring section 102 |
| At 1.80 seconds | Neck ring sections on press table L opened |
| At 1.90 seconds | Blow head 150 at transfer station of press table L lowered and locked |
| At 1.90 seconds | Blow mold table M again in motion |
| At 2.0 seconds | R press mold table starts to move. Cycle completed. |

The above outlined time intervals can, of course, be varied to some considerable extent in accordance with the size and the character of the articles being produced; it being only necessary to so time the blow table movements as to carry the filled blow mold at the transfer station of the press mold L out of the way of the advancing neck ring and suspended parison on the press table L.

It will be apparent to those skilled in the art that various structural changes may also be made in different parts of the previously described combinations without altering its fundamental characteristics of operation. One such exemplary change is shown in Figs. IV and V which illustrate another way of effecting the periodic up and down movement of the feeder bells. In this alternative construction each of the large gear wheels 5'—5' is provided, on its under face, with a surface cam track a—a, that is engaged by two oppositely disposed cam rollers b—b which are mounted on the heads of threaded and splined standards c—c, and which may be simultaneously raised or lowered by a pair of worm wheel nuts d—d and worms e—e that are concurrently moved by a suitable hand wheel f, or other suitable means (see Fig. V) to vary the maximum lift of the feeder bell B—B.

The construction illustrated in Figs. I to XXXVI presents a number of novel and useful features, which are not themselves directly involved in carrying out the hereinbefore described mode of operation, but which contribute to the effectiveness of the results obtained thereby. Since a considerable part of the three-table-forming mechanism is located in close proximity to the feeder forehearth it is desirable to protect it as completely as possible from radiant heat. In order to accomplish this result I completely enclose the sides and bottom of the forehearth A in a metal box 210 that is constructed from sheets of stainless steel or nichrome alloy which have a relatively low coefficient of heat conductivity, and which are also highly polished on both their interior and exterior surfaces. I also provide means for preventing all escape of hot gases of combustion through the roof of the forehearth by covering the major portion of it with another metal plate 211, which is provided with raised flanges 212 that form annular pockets 213 around the openings through which the upper ends of the feeder bells B—B and of the baffle gate block 214 project; attaching to the supporting heads of these members B—B and 214 are downwardly extending sheet metal skirts 215, that enter the said pockets 213; which are filled with a suitable fusible metal—such as a lead, zinc, or cadmium alloy—that becomes liquid at the normal temperature of the forehearth roof blocks. Combustion gases are vented from the forehearth back into the furnace proper, and for this purpose the block 260 is provided with the opening 260' located above the glass level, and thus performs the function of a skimmer block and a vent. The block 260 may also be lowered to cut off the flow of glass from the furnace to the forehearth, and the opening 260' is so located as to be well above the glass level even when the block is in its lowermost position.

The various moving parts of the combined feeder and forming mechanism, which has been thus far described, are operated in part mechanically and in part pneumatically. The motive fluid for actuating the pneumatically operated elements—as well as for blowing the blanks etc.—may be supplied from any suitable source; but in order to make each machine a self contained entity, I prefer to provide it with a two stage air compressor unit which is located in the base of the machine frame (see Figs. IX, XII and XIII), and which comprises a set of low pressure cylinders 221—that supply the air for operating the auxiliary power movement of the blow mold table M, for blowing the blanks, and for expelling the glass from the feeder bells— and a set of high pressure (second stage) cylinders 222 that furnish the air for pressing the blanks, for closing the blow molds S, for opening the neck ring sections 102 of the press molds R—L, and for locking down the blow heads 150. The air compressor unit is driven from the central longitudinal shaft 59 of the machine, which is connected to the crank shaft 223 carrying the pistons 224—225 through the gears 226—227. The air from the compressors 221—222 passes through passageways 240 (one of which is shown in Fig. IX) in the cylinder block and communicating passageways 241 in the frame of the machine and is stored in suitable tanks 228 and 229, one of which (229) constitutes the receiver between the two stages of the compressor and also a source of low pressure compressed air. Each stage of the compressor is in effect a high speed pump and accomplishes adiabatic compression of the air, and the arrangement is such that the air from the high pressure stage is utilized at substantially the temperature of compression. This compressor unit (cylinders 221—222, pistons 224—225, and crank shaft 223) is so constructed that it may be readily removed from below (see Fig. IX) without disturbing any of the other parts, and without even disconnecting any pipes by merely removing the bolts 242—242.

The entire forming machine structure—which in this case also carries the double acting shear blade mechanism 40—41—is mounted on track wheels 230 so that it may be readily rolled away from the forehearth A and over a floor pit, for the purpose of removing the bolts 242 and the compressor unit, or for other purposes. But in order that this may be done the two upper press cylinders 171—171 must be moved apart to clear the widened front end of the forehearth; and to facilitate this movement the arms 189 supporting these cylinders are revolvably mounted on the standards 188 about which the press mold tables R—L revolve. By uncoupling the pipe connection that leads from the lower to the upper cylinder 173—171 and slacking back on the socket engaging set screws 231 which lock the upper cylinder head 171 to an upper cross bar 232, the press cylinders may be swung outwardly a sufficient distance to pass the front end of the forehearth. It is then only necessary to disconnect the coupling 233 in the vertical shaft 13 which transmits motion to the bell operating mechanism (see Fig. I); and uncouple the pipe 31 which leads from the top of the blow table standard 152 to the caps 30—30 on the upper ends of the bell shafts 1—1; after which the forming machine may be run back from its normal operating position without disturbing any of the adjustments on either the feeder or the forming machine parts of the combination.

The possibility of substantially varying the mechanical structure of my improved combination without altering its distinctive character is further exemplified by another embodiment of my invention which is illustrated in Figs. XXVII to XXXIV, inclusive. In this embodiment, the feeder unit is of the reciprocating bell plunger type—as contrasted with the reciprocated bell air pressure type of Fig. I—and comprises two vertically reciprocable bells B' and B' that are positioned over a pair of twin or dual orifices F'—F' in the forehearth A' and plungers G—G that are vertically reciprocable within the bells B'—B'. Each bell and plunger unit B'—G and B'—G is adapted to be periodically, but alternately, moved up and down to effect the segregation and delivery of preformed mold charges in alternate succession through the orifices F'—F'.

Each of the bells B'—B' is detachably secured to the lower ends of a sleeve 300 rotatably mounted in a ball race 304 carried by the crosshead 305 and has an external gear 301 thereon which meshes with the corresponding gear 301 on the other sleeve and with an elongated pinion 302 which is secured to a driven shaft 303. Each of the sleeves 300—300 is detachably secured to a collar 306 which is carried on the outer end of a pivoted forked arm 307 that is periodically rocked up and down to raise and lower the bell B' by a cam 308 on a cam shaft 309 that engages a roller 310 carried on the upper end of a weighted arm 311 that is attached to the inner end of an arm 307 (Fig. XXXIII).

The upper ends of the plungers G—G are detachably secured to hollow shafts 312—312 which extend through open ended cylinders 313—313 carried by the crosshead 314 and each shaft has a piston sleeve 315 mounted thereon which is moved up and down in its respective cylinder 313, to raise and lower the plunger, by suitable motive fluid, such as compressed air, delivered alternately to the opposite ends of the cylinder 313 through pipes 316—317 that are connected to the source of compressed air through a timer valve 318. The timer valves 318—318 are periodically actuated to alternately connect the opposite ends of the cylinders 313—313 to motive fluid by cams 319—319 on the cam shaft 309 which is connected by miter gears 320—320 to a vertical shaft 321 that, in turn is geared to the motor shaft 321a of a continuously driven variable speed motor 321b. The shaft 303 for rotating the bells B'—B' is also driven from the cam shaft 309 through the gear and shaft elements 322—323—324—325—326.

In order to control and adjust the up and down stroke of the plungers G—G, the open ends of each of the cylinders 313—313 are closed by sleeve nuts 327—327 which are threaded into the ends of the cylinder and are operatively connected to two co-axially mounted rotatable shafts 328 and 329 through the sprocket wheel and chain elements 330—331—332 (upper sleeve nut) and the gear, pinion, sprocket wheel and chain elements 333—334, 335—336 and 337. From this arrangement, it is apparent that each of the sleeve nuts 327—327 closing the ends of each of the cylinders 313—313 is independently movable into and out of their respective cylinders and as a result, the stroke of the pistons 315 and consequently the movement of the plungers G—G may be readily and independently varied and adjusted to control the shape and size of the preformed mold charges.

To assist the plungers G—G in expelling the molten glass segregated in the bells B'—B' through the orifices F'—F', on the down strokes thereof, compressed air is simultaneously introduced into hollow members 340—340 which are formed integrally with the piston sleeves 315—315 and communicate with the interior of the shafts 312—312 and from which it is delivered to the interior of the bells B'—B'. The compressed air is introduced into the members 340—340 through the pipes 341—341 which are connected to a suitable source of such air, at the proper time in the down strokes of the plungers G—G, by cams 342—342 on the cam shaft 309 which actuates a timer valve 343 positioned in the compressed air lines 341—341.

The cams 308—308 controlling the raising and lowering of each of the air bells B'—B' are so arranged on the cam shaft 309 with respect to the cams 319—319 controlling the operation of the plungers G—G that each bell will be moved upwardly before the plunger whereby a flow of glass is established from the forehearth A' through the orifice F" prior to the upward movement of the plunger and as a result, there is no retardation or retraction of the flow through the orifice at the beginning of the up stroke of the plunger, but there is a diminution and a natural necking in the stream as a result of this decelerated flow under the influence of gravity alone. Thus, two continuously flowing streams of glass are produced, each of which is composed of a series of regularly recurrent sections of enlarged diameters connected together by portions of reduced diameters, and since each bell and plunger unit is working alternately with respect to each other, the enlarged portions of one stream are formed, while natural necking is taking place in the other stream, and these streams are adapted to be alternately severed, at the points of reduced diameters, into successive and preformed mold charges that are delivered alternately to the press molds of the forming machine. The mechanism employed for alternately severing the streams of molten glass is the same and is actuated in the same manner as that heretofore described in connection with the construction illustrated in Figs. I to XXVII, inclusive.

The forming machine employed in this embodiment of my invention as in the first embodiment, comprises two press mold tables R'—L' which alternately receive the mold charges severed from the streams, and a blow mold table M' in which the charges are blown to final shape.

Each press mold table R'—L' carries four molds P' (instead of five as in previously described construction) and both the upper neck ring sections 102' and the lower body sections 101' of each of these molds are constructed and operated in exactly the same way and manner as in the first illustrated embodiment of my invention. The arrangement of the upper pressing cylinders 171' and of the lower mold supporting cylinders 173' is also the same, save that the upper press cylinders 171' are rigidly and permanently fixed in position, as they are sufficiently separated to clear the front end of the forehearth (Fig. XXX)—which is in this case of less width than that shown in Fig. I—and each is supported both by the central standard of the press table, and by a pair of tubular posts 346—346 that also serve as conduits for the motive fluid. The press tables are each rotated step by step through 90 degree intervals by a four slot Geneva wheel 350 whose period of action is 0.25 and whose period of rest is 0.75 of the time of revolution of its driving crank pin 351 (see Fig. XXXI). These crank pins 351—351 are carried by worm wheels 352—352 that are moved in unison by a single worm 353 on the central longitudinal driving shaft 354 (also as in Fig. IX, etc.) that is connected by a silent chain to the variable speed motor 321b placed at one side of the forming machine (see Fig. XXX and compare with Fig. XIII).

The blow mold table M' carries fourteen molds S' which are spaced at 25.174-degree intervals and is moved, step by step, through this interval to carry the molds S' to the transfer position by a fourteen slot internal Geneva wheel 356 whose period of action is 0.5714, and whose period of rest is 0.4286—of the time of one revolution of its driving crank pin 357 which is carried by a vertical shaft 358 that is driven from the shaft 354 through a worm wheel 359 and worm (not shown) at the outer end of the central drive shaft 354. This movement of the Geneva wheel 356 is assisted by a pneumatically operated piston in substantially the same manner and with substantially the same elements or parts illustrated by Figs. XIII–XIV for assisting the rotation of the blow mold M in the first embodiment of my invention. Here, as before, the piston which is mounted in the cylinder 360 is flexibly connected to a driven drum that is coupled, by a one-way pawl and ratchet drive (not shown), to a pinion 351 which engages an internal gear indicated at 362 on the blow mold table M' (Fig. XXX). The admission of motive fluid to the piston cylinder 360 is controlled by a cam (not shown) on the Geneva crank shaft 358, which also serves to disengage a vertical locking pin (not shown) from one of the holes 365 which are intermediate the table slots of the Geneva movement, and with which the pin engages when the table comes to rest (see Fig. XXX). This cam and locking pin are substantially similar to the cam 95 and locking pin 96 shown in Fig. XIV.

Each of the blow molds S' of this second exemplification of my improved forming machine is opened and closed by an intergeared twin shaft mechanism 366—367 similar to that used to operate the neck ring sections of the press molds (see central portion of Fig. XXX). These twin shafts 367—367 are concurrently revolved in opposite direction—to close the mold—by means of a piston 368 having a crosshead 368a attached thereto which simultaneously engages rollers 369 on the lower side of the shaft connecting sector gears 366—366 (see Figs. XXXI and XXXII). The crosshead piston 368 is moved outwardly in its operating cylinder 370 by motive fluid which is admitted to the rear end thereof by a two way poppet valve (not shown) which is similar, in construction and operation, to the one shown in Figs. XI, XII and XIII and is returned to inner position by tension springs 371—371. There are two of these cylinder units 370—370 located symmetrically on the opposite sides of the blow mold table frame (beneath the table) which are respectively used, at alternate intervals, to close the blow molds S' at the transfer stations of the press molds R'—L'.

Each blow mold S' is also provided with a swinging blow head 375 and with operative crank arm mechanism 375a therefor which is substantially identical with that already described, (compare Fig. XXXII with Figs. X, XI, XVI and XVII), save that the heads 375 shown in Fig. XXXII are not provided with any side locking arms for engaging the closed mold sections. The blowing heads 375 which are mounted on the outer ends of the swinging pipes 376 are moved to locked position by a cylinder-piston assembly 377—378 which are positioned on top of the forming machine frame in radial alignment with the transfer points of the press molds R'—L' (vertically above the piston-cylinder assemblies 368—370 for closing the blow mold sections); and both of these blow head cylinders 378 are constructed and operated in precisely the same way as the corresponding elements of the first described construction with the exception that in this case separate cams and timer valves for admitting motive fluid in succession to the neck ring operating cylinders 116 (on the press table supports) and to the blow head cylinders 378 (on the blow table supports) are dispensed with. In this construction the motive fluid used to actuate these cylinders 116—116—378—378 is supplied through ports 379 in the cylinders 370 that are opened by the forward movement of the pistons 368 which close the blow molds. Pipes 380—380 connect the ports 379 with the cylinders 116—116 and pipes 381—381 connect the cylinders 116—116 with the cylinders 378—378. Thus the air which is admitted to the rear or inner end of each of the blow mold cylinders 370—370 serves, in turn, to (1) close and lock the blow mold sections S', (2) open the neck ring sections 102' and release the parison blank in the closed mold S', and (3) lock down the blow head 375 on the closed mold S'.

The flow of motive fluid to each of the press plunger cylinders 171'—173' is controlled by a double-action-two-way timer valve 385 that is actuated by cams 386—386 on the vertical shaft 321 operating the feeder mechanism (see Fig. XXXIV). The two delivery pipes 387—388 from each of these valves 385 are connected respectively to the bottom of the lower press cylinder 173' and to the interior of one of the adjacent tubular posts 346 which extends upwardly to the top of the upper cylinder 171' and is there cross connected by means of the pipe 389 to the tubular standard 390 on which the adjacent press mold table revolves. The other of the tubular posts 346 serves as the communicating conduits that connect the top of the lower cylinder and the upper end of the pressing cylinder, and are each provided at their upper termini with automatic check valves like those shown at 192 in Figs. VIII and XXIII. The upper connections to the tops of the neck ring cylinders 116—116 and to the rear ends of the blow head cylinders 378—378 are each provided with similar valves to ensure the immediate and complete exhaust of air from those cylinders when the connections thereto are closed by the retraction of the first piston of the series.

An illustrative time schedule of the sequence of steps taken in one complete cycle of operations of the last described construction follows:

| Time | | Event |
|---|---|---|
| At 0.0 | second | Charge delivered to mold on press mold table R' and table begins to move |
| At 0.50 | second | Movement of press mold table R' completed |
| At 0.50 | second | Press mechanism of mold R' set in operation |
| At 0.633 | second | Blow mold S' at transfer station of mold R' on parison blank |
| At 0.766 | second | Neck ring sections 102' on press mold R' opened |
| At 0.90 | second | Blow head 375 for mold S' locked down at transfer station of mold R' |
| At 0.90 | second | Blow mold table M' begins to move |
| At 1.0 | second | Charge delivered to mold on press mold table L' and this table begins to move |
| At 1.4714 | seconds | Blow mold table M' stops (time of movement 0.5714 sec.) |
| At 1.5 | seconds | Press mold table L' stops |
| At 1.633 | seconds | Blow mold S' closed on parison blank at transfer station of mold L' |
| At 1.766 | seconds | Neck ring sections 102' on press mold L' opened |
| At 1.9 | seconds | Blow head 375 locked down on mold S' at transfer station of mold L' |
| At 1.9 | seconds | Blow mold table M' started |
| At 2.0 | seconds | Press mold table R' started. Cycle completed. |

In Fig. XXIX the press molds P' are shown in the position which they occupy at 0.766 second (supra); and in Fig. XXX, both the press molds P' and the blow molds S' are shown in the positions which they have at the end of 1.2214 seconds (supra); after the blow mold table M' has been moving for 0.3214 second; and the press table L' has been moving 0.2214 second. The total time allowed for the transfer operations (e. g., 0.4 sec.) in the above schedule is longer than in the operation of the first described organization, because the construction now being considered is designed for the fabrication of somewhat larger articles (e. g., quart jars). This, of course, necessitates the use of a somewhat greater center to center distance between successive molds on both the press tables and the blow table.

In Figs. XXXV to XLVI still another embodiment of my three-table-forming machine is illustrated which is designed for use in conjunction with a feeder of the same character as that described in connection with Figs. XXVIII and XXIX that is indicated diagrammatically in Fig. XXXV.

The two press mold tables R"—L" of the construction now under consideration are so positioned with respect to the forehearth A' that their axes of revolution 400—400 are in a plane a substantial distance in front of the plane of the two delivery orifices F'—F' (see Figs. XXXV and XXXVI); and as a result of this, the two points of transfer of the tables R"—L"—that is, where the lines of movement of the press mold P" centers intersect the line of movement of the blow mold S" axes—are brought closer to each other, and are only separated by a distance equal to that between the centers of two successive blow molds S". This permits of the simultaneous transfer of two parison blanks from the press molds P", (one from the table R" and the other from the table L"), to two adjacent blow molds S"; and also permits the two press tables R"—L" to be moved concurrently by one common driving mechanism. The two press tables R"—L" are secured to meshing gears 401—401 and are moved, in unison, by a single three slot external Geneva wheel 402 (Fig. XLI), which is secured to a vertical shaft 403 connected to one of the mold tables through the spur gears 404— 405 which are of 3:4 ratio and thus rotate the press molds R"—L" concurrently through one-fourth of a revolution on each one-third revolution of the wheel 402. The Geneva wheel 402 is actuated by a crank pin arm 406 which is secured to a vertical shaft 407 that is in turn driven from the motor shaft 408 through the worm and worm wheel elements 409—410 (see Figs. XXXVIII, XXXIX and XL). This same worm wheel shaft 407 also carries a second crank pin arm 411 which forms a part of a seven slot internal Geneva wheel 412 that moves the blow mold table M" (see Figs. XXXVIII and XXXIX); but the two Geneva movements—one of which has a period of action of one-sixth, and the other of which has a period of action of 0.6429 of the time of crank pin rotation—are so timed that the movement of the blow mold table M" is completed before the press mold tables R"—L" begins to move. In order to relieve both of these Geneva mechanisms 402—412 from the major part of the work of moving the heavy table assemblies—and thus impose on them only the duty of effecting the desired synchronisms of mold movement—I provide an auxiliary power mechanism which comprises a double acting pneumatic cylinder 413, whose piston 414 is connected, at one end to a rack bar 415 that engages a sector gear 416 journaled on the axis of the blow mold table M" and coupled thereto by a one-way pawl and ratchet wheel drive 417—418. The opposite ends of the piston 414 is connected to a flexible strap 419 that encircles a drum 420 rotatably mounted on the hub of the driving gear 401 of the press mold table R" and coupled thereto by a one-way roller clutch 421 (see Figs. XXXIX and XLV). Motive fluid is alternately admitted to the ends of this auxiliary power cylinder 413, at the instants when the Geneva mechanisms 402—412 come into action to initiate the movements of the blow mold table M" and the press mold tables R"—L" by a timer valve 422 that is actuated by a cam 423 on the crank shaft 407 of the said mechanisms (see Figs. XXXVIII and XLI).

Each press mold table R"—L" carries four mold units P", and in order to move these tables through the mold interval (90 degrees) at each operation of the three slot Geneva movement 402, the spur gears 404—405 connecting the Geneva wheel 402 to the press mold L" are of 3:4 ratio, so that the two connected press mold tables R"—L" are concurrently revolved one-fourth a revolution at each one-third revolution of the three slot Geneva disc 402. Press mold tables R"—L" are locked in position during their period of rest, in the usual manner, that is by the engagement of the hub 406a of the Geneva crank pin member 406 with the segmentally recessed edges of the Geneva wheel 402. The larger and heavier blow mold table M" is locked in its positions of rest, by a vertically reciprocable pin 425 which engages with one of the driving slots in the edge of the wheel 412, and is withdrawn therefrom—just before the table begins to move—by a lever 426 that is moved downwardly by a cam projection 427 on the lower side of the driving crank 411 of the associated Geneva movement (see Figs. XXXIX, XLI and XLVI).

In this construction all of the mold sections— i. e., the neck ring and body sections of the press or parison molds P" and the divided halves of the blow molds S"—are opened and closed by intergeared twin shaft mechanisms, similar to those shown in Figs. XI, XXXIX, XXX and XXXII. The intergeared twin shafts 430—430a which operate the upper and lower sections of the press molds P" are coaxially mounted (see Fig. XLIII); and are moved independently. The shafts 430 which are connected to the neck ring sections (see the right hand upper portion of Fig. XXXVI and the upper part of Fig. XLIII), are actuated in unison by a cylinder and plunger mechanism 431 identical with that shown in sectional detail in Fig. XXII; and the shafts 430a which are connected to the body sections of the molds P" (see left hand upper portion of Fig. XXXVI and the middle and lower portion of Fig. XLIII) are actuated by a crank arm 432 which is keyed to one of these shafts 430—430a and is provided at its end with a cam roller 433 that is engaged by a stationary cam track 434 on the machine frame (see Figs. XXXVIII, XXXIX, XLIII and the enlarged sectional view of Fig. XLV). The intergeared shafts 435—435a which are linked to the blow mold sections S" (see lower part of Fig. XXXVI, and Figs. XLII and XLIV) are concurrently rotated, to close and open the molds, by crank arms 436 which are secured to the upper ends of the shafts 435 of each pair of shafts, and which are also provided at their ends with cam rollers 437. These crank arms 436 are rocked in one direction, to close the molds, by a reciprocable piston 438 which is moved outwardly in a cylinder 439 in which it works by the admission of motive fluid to the rear end thereof and is returned to its inactive position by means of a spring 440 (see Figs. XXXVI, XXXVIII, XLII, and XLIV). The crank arms 436 are moved in the opposite direction to open the molds S" by the engagement of the crank arm rollers 437 with an inclined cam 441 positioned just in advance of the discharge station (shown in Fig. XXXV only).

When, as in this case, the tables are so arranged that there may be a simultaneous transfer of two parison blanks—one from each of the press tables R"—L"—to two immediately adjacent blow molds S", only one cylinder-piston mechanism 439—438, located on the center line of the forming machine, is necessary to close these two molds concurrently, but they are opened successively, while the blow mold table is in motion, as the cam rollers 437 on the shaft 435 engage the cam track 441 as they approach the discharge station.

Each blow mold is provided with a blow head 445 of the same general construction as those previously described (see (Figs. X, XVI and XVII, etc.); but in the arrangement now being considered these heads 445 are arranged in pairs that are supplied with blowing air by a common conduit 446 which is flexibly connected, at its inner end, to the central distributing head 447 about which the blow table M" revolves, and which is engaged near its center by a compression spring 448 which serves to lift the blow heads 445—445 away from the blow molds S". Each pair of connected heads 445—445 is locked down on the associated pair of molds S" by means of a single link mechanism 450 which is substantially identical with that previously described; and which is moved in one direction, to lower the heads, by a piston cylinder assembly 451—452, positioned immediately below the cylinder 439 employed to close and lock the blow mold sections (see Fig. XXXVIII). The link mechanism 450 is moved in the opposite direction, to unlock the blow heads 445—445 and permit them to be raised by the spring 448, by means of an inclined cam track 453 (see Fig. XXXV). The mold closing cylinder 439 is supplied with motive fluid through a pipe connection 455, which passes down through the center of the blow mold table pedestal 447 and periodically connected to a source of such fluid by a timer valve 456 that is actuated by a cam 457 on the vertical crank shaft 407. As before, this motive fluid delivered to the cylinder 439 passes in succession through pipe connections 458 to the two neck ring cylinders 431—to simultaneously open the neck ring sections of both press table molds R"—L" at the transfer stations—and then through pipe connections 459 back to the blow head cylinder 452—to perform the final step of the transfer operation—and is then exhausted concurrently from all three cylinders to permit the return of their piston members to the inactive position. The air for operating the press plungers 460 is simultaneously supplied to the press cylinders 461 of the press molds R"—L" by a double action two-way timer valve 462 (which is actuated by a third cam 463 on the crank shaft 407) through pipes 464—465 which are respectively connected to the hollow exteriors of the two tubular columns 400—400 on which the press tables revolve, (from which it passes through the upper cross heads 466 to the lower ends of the press cylinders 461), and to the upper ends of these cylinders 461. In this case only one press cylinder 461 is used for each press table, but the outer posts 470 which assist in supporting these cylinders 461 are provided with massive thrust blocks 471 on which the molds P" rest when the pressing is performed and which serve to relieve the press mold supports from the strain of this operation. The use of these thrust block supports 471—which present a certain amount of frictional resistance to the movement of the molds P", onto, and away from them—is not objectionable when an auxiliary power device is used to assist the Geneva mechanism in moving the press mold tables.

An exemplary time schedule of the successive step by step acts which are performed by the last described combination of feeding and forming mechanism—when it is operated at a speed of approximately sixty jars per minute—would be as follows:

| | | |
|---|---|---|
| At 0.0 second | | Two mold charges are simultaneously delivered to the R and L press molds at the delivery orifice stations |
| At 0.0+ second | | Both press mold tables begin to move simultaneously |
| At 0.333 second | | Both press mold tables are brought to rest and motive fluid is admitted to the upper ends of the press cylinders |
| At 0.46 second | | Blow molds at the R and L transfer stations are simultaneously closed |
| At 0.59 second | | Neck ring sections of press molds at these stations are simultaneously opened |
| At 0.72 second | | Blow heads of molds at transfer stations are concurrently locked down |
| At 0.72+ second | | Blow mold table set in motion |
| At 1.9 seconds | | Press plungers raised (time of pressing 1.57 sec.) |
| At 2.006 seconds | | Blow mold table stopped (time of movement 1.286 sec.) |
| At 2.006 seconds | | Two more mold charges delivered and the two press tables started again. (Completion of cycle.) |

When an even number of feeder and forming machines are grouped in front of the melting tank—as illustrated in Fig. XXXVI—it is sometimes advantageous to so arrange these machines that the blow mold tables M" of adjacent ones move in opposite directions and thus deliver the formed articles to a single common conveyor (as illustrated in dotted lines in Fig. XXXV); the driving mechanisms 321b—321b being so arranged that the table movements occur alternately at equally spaced intervals, in order to avoid a "bunching" of the finished ware on the single conveyor. When an odd number of machines is arranged in front of the tank (as shown in Fig. VI) this arrangement of the machines in pairs is not so desirable.

From the foregoing description of my invention it is apparent that each of the feeder mechanisms is readily and independently adjustable, and as a result, uniformity in the mass of the successive mold charges delivered alternately to the two press mold tables is readily maintainable. Further, with my improved dual feeder, by rotating the bells concurrently in opposite directions, I am able to produce a symmetrical current circulation in the forehearth which may be flowing in the same direction or in the opposite direction to the currents of heating gases introduced into the forehearth and consequently the molten glass in the forehearth is maintained at a more nearly uniform temperature than can be secured with the present feeding mechanisms since this concurrent rotation of the dual feeding devices in opposite directions keeps the molten glass well agitated and prevents the localization of cold spots therein.

What I claim as new and desire to secure by Letters Patent is:

1. In combination with a feeder for molten glass having dual means for establishing twin streams of molten glass adapted to be severed into mold charges, of a forming machine having a pair of press mold tables each having a series of parison molds thereon for receiving the charges severed from said streams, means associated with each press table for shaping such charges into blanks, a blow mold table, and means for accomplishing a transfer of the blanks from the parison mold of each of said press mold tables to said blow mold table.

2. In combination with a feeder for molten glass having dual means for establishing twin streams of molten glass adapted to be severed into mold charges, of a forming machine having two press tables each having a series of parison molds thereon, for receiving the mold charges, a blow table having a series of blow molds thereon, and cooperating means for effecting a transfer of the blank from the parison molds to the blow molds, a head for each of said blow molds, and means actuated by said transferring means for moving said heads into operative engagement with said blow molds.

3. In combination with a forehearth for molten glass having twin submerged orifices therein, and means for alternately accelerating the flow through each of said orifices, of a forming machine disposed beneath said forehearth and having two press mold tables one of which is positioned under each of said orifices, each of said tables having a series of spaced blank molds thereon, means for alternately severing the glass streams flowing through said orifices into mold charges, and delivering said severed charges to the molds of said press tables, means for periodically and alternately rotating each of said press tables to present successive molds in a charge receiving position and then at a transfer position, a table having a series of spaced blow molds thereon, means for rotating said blow mold table, and means for accomplishing a transfer of charges from first one and then the other of said press tables to the blow molds.

4. In combination with a forehearth for molten glass having twin orifices therein, and means associated with each of said orifices for forming a flowing stream of glass therethrough of regularly recurrent enlarged sections adapted to be severed into individual mold charges, of a forming machine comprising two press mold tables, one positioned below each of said orifices and having a series of spaced blank molds thereon for receiving the charges severed from the streams, means for periodically turning said tables to position each mold on each table under its respective orifice, means for preshaping the charges delivered to said molds, a blow table having a series of spaced molds thereon, means for periodically rotating said blow table to position the molds in position to receive the blanks from the molds of said press tables, and cooperating means for accomplishing a transfer of the blanks from the molds of the press tables to the molds of the blow table.

5. A forming machine comprising a pair of rotatable press tables, a series of spaced parison molds on each said press table, each of said parison molds having a divided neck ring section, a blow table having a series of blow molds thereon, means for intermittently rotating each of said press tables to move successive molds on each table to a transfer station, means for intermittently rotating said blow table to move the molds thereon past the transfer station of each press table, means at the transfer station of each press table for closing such blow molds, and means for controlling the operation of said blow mold closing means for opening the neck ring sections of the molds on said press tables to effect a transfer from the said parison molds to the blow molds.

6. A forming machine comprising a pair of rotatable and adjacent press tables, a plurality of blank molds on each of said tables, each including an upper section and a lower section, means for intermittently rotating each of said press tables to move the molds on each table to a transfer station, means operable on the rotation of each of said tables for opening the lower sections of said blank molds as they approach said transfer station and closing such sections after they have passed such station, a blow mold table adjacent said press tables, a plurality of blow molds carried by said table, a head for each of said blow molds, means for intermittently rotating said blow mold table to present molds at the transfer station of each press table, means operable when said blow mold table is at rest for closing the blow molds at the transfer station of each press table, means controlled by the operation of said blow mold closing means for opening the upper sections of said blank molds to effect a transfer from said press tables to said blow mold table, and means actuated on the opening of said upper sections for moving the heads into engagement with said blow molds.

7. A forming machine comprising a pair of rotatable press tables, a plurality of press molds each composed of an upper and lower section carried by each of said tables, a rotatable blow table, a plurality of blow molds carried by said blow table, a head for each of said blow molds, means for intermittently and alternately rotating each of said press tables to move the press molds successively to transfer positions, means for opening the lower section of the molds on each press table as they approach the transfer positions, means for intermittently rotating the blow table to position alternate blow molds at successive transfer positions, means for closing the blow molds at the transfer positions, means for opening the upper section of each press mold, means controlled by the closing of the blow molds for effecting an opening of the upper sections of said press mold, and means actuated by the operation of said upper section closing means for moving said head into engagement with said blow molds.

8. The method of making glassware which consists in establishing and maintaining continuously flowing streams of molten glass through two submerged orifices, alternately and periodically accelerating the flow through each of said orifices, severing mold charges from said streams during their periods of decelerated flow, pressing the severed charges into blanks while moving the charges severed from each stream in different paths, and blowing the blanks into finished form while causing said blanks to travel in the same path.

9. A method of fabricating glass articles from a mass of molten glass, which includes causing two streams of molten glass to simultaneously flow from such mass, alternately severing the depending ends of such streams to form mold charges, delivering such charges severed from one such stream to the successive molds of one series and such charges severed from the other such stream to the successive molds of another series, partially forming all such charges, transferring the partially formed charges from each series of molds to the successive molds of a third series and completing the formation of such charges while in the molds of the third series.

10. A method of fabricating glass articles from a mass of molten glass, which includes causing two streams of molten glass to simultaneously issue from such mass, alternately severing such streams to produce mold charges, causing charges severed from the different streams to travel through separate paths during the initial period for article formation and then causing the partially fabricated articles to travel in the same path during the final period of article formation.

11. A method of fabricating glass articles from a mass of molten glass, which includes causing two streams of molten glass to simultaneously issue from said mass, alternately severing such streams to produce mold charges, delivering the mold charges severed from one such stream to the successive molds of a series of parison molds, traveling in one direction and the mold charges severed from the other such stream to the successive molds of a series of parison molds traveling in another direction and then delivering parisons from both such series to the molds of a series of finishing molds all traveling in the same direction.

12. A method of fabricating glass articles from molten glass, which includes alternately delivering mold charges to the successive molds of two series of intermittently moving molds, and delivering partially finished articles from the successive molds of both such series to the molds of an intermittently moving series of finishing molds.

13. A method of fabricating glass articles from molten glass, which includes delivering mold charges to the successive molds of two series of parison molds, delivering partially finished articles from each such series to the successive molds of a series of finishing molds and then delivering completely formed articles from the successive molds of such last mentioned series.

14. A method of fabricating glass articles, which includes delivering mold charges to the successive molds of two series of parison molds, and then in successively delivering parisons from each such mold to alternate molds of a series of finishing molds.

15. A forming machine comprising a blow mold table, blow molds mounted thereon, two blank mold tables, blank molds mounted on each of said tables, means for moving all said tables in synchronism, and means for delivering blanks from successive molds of both said blank mold tables to molds of said finishing mold table.

16. A glass fabricating mechanism comprising two series of press molds in which charges of molten glass are adapted to be partially fabricated, a single series of blow molds in which the partially fabricated charges are finally formed, and means for transferring the partially fabricated articles from each series of press molds to the single series of blow molds the number of blow molds being greater than the aggregate number of press molds of both series.

17. In combination with the blow mold of a glassware fabricating machine, of a head adapted to be moved into engagement with said mold, comprising a hollow member adapted to be connected to a source of pressure and having depending spaced arms for engaging the sides of said mold, a mold engaging member movable relative to said member, and flexible means connecting said members.

18. A head for delivering fluid pressure to the blow mold of a fabricating machine comprising a hollow member adapted to be connected to a source of pressure, a mold engaging member movable relative to said hollow member and means controlled by the movement of said movable member for establishing communication between the hollow member and said blow mold.

19. A head for closing and delivering fluid pressure to a blow mold comprising a hollow member connected to a source of pressure, arms depending from said hollow member and adapted to engage the sides of said blow mold, a member adapted to engage the top of said blow mold and movable relative to said hollow member, a bellows joining said members, and means controlled by the movement of said movable member for establishing communication between said hollow member and the cavity of said blow mold.

20. In a glassware fabricating machine, a movable head for closing a finishing mold and for delivering fluid pressure thereto comprising a hollow member connected to a source of pressure and having a port therein, arms depending from said hollow member and adapted to engage the side of said finishing mold when said head is moved into engagement therewith, a valve normally closing the port in said hollow member, means carried by said head and adapted to engage said finishing mold for unseating said valve and connecting the cavity of the mold with the source of fluid pressure, and means for venting said cavity during the blowing operation.

21. In a glassware fabricating machine, a head adapted to be moved into engagement with a blow mold for delivering pressure thereto comprising a hollow member connected to a source of pressure and having a port therein, a mold engaging member movable relative to said hollow member, and flexibly connected thereto, and a valve for normally closing the port in said hollow member adapted to be operated on relative movement between said members.

22. In a glassware fabricating machine, a table having a series of molds thereon, a member for releasably locking said table against rotation, means for periodically moving said member to unlock said table, mechanical means for intermittently rotating said table, an auxiliary means for assisting said mechanical means in rotating said table.

23. In a glassware fabricating machine, a rotatable mold table, a Geneva wheel for controlling the rotation of said table, and auxiliary means responsive to the movement of said Geneva wheel for rotating said table.

24. In a glassware fabricating machine, a rotatable mold table, a Geneva wheel secured to said table, means for driving said wheel to turn said table through successive steps, and auxiliary table rotating means controlled by the driving means of said wheel.

25. In a glassware fabricating machine, a pair of rotatable press mold tables, means for alternately rotating said press mold tables, a rotatable mold table having a series of spaced openings therein, a pin movable into successive openings in said table for locking said table against rotation, means for periodically withdrawing said pin, means controlled by said pin-withdrawing means for turning said table, and a Geneva wheel for controlling the speed of rotation of each of said tables.

26. In an apparatus of the character described, a two-part mold having the parts thereof mechanically coupled together whereby movement of one part imparts movement to the other part of the mold, and fluid actuated means for moving said parts to open said mold, including a cylinder having a two-part piston therein adapted to be moved into engagement with and turn one part of said mold.

27. In an apparatus of the character described, a two-part mold having the sections thereof mechanically coupled together whereby movement of one section imparts movement to the other section, means for moving said section to open said mold, including a cylinder having a two-part piston movable into engagement with one section of said mold, and means for imparting rotary movement to one part of said piston to turn the sections of said mold.

28. In an apparatus of the character described, a two-part mold having the sections thereof mechanically coupled together whereby movement of one section imparts movement to the other section, means for moving said sections to open said mold, including a cylinder adapted to be alternately connected to a source of fluid pressure and to atmosphere, a piston movable in said cylinder, a second piston within said cylinder for engaging one section of said mold, and means for imparting a rotary movement to said last-mentioned piston.

29. In an apparatus of the character described, a two-part mold having the sections thereof mechanically coupled together whereby movement of one section imparts movement to the other section, means for moving said sections to open said mold, including a cylinder, a piston movable in said cylinder, and means associated with said piston for engaging and imparting a turning movement to one section of said mold on movement of said piston within said cylinder.

30. In an apparatus of the character described, a two-part pivoted mold having the sections thereof geared together so that the sections turn in unison, and means for turning one of said sections to open said mold, including a cylinder adapted to be alternately connected to a source of fluid pressure and to atmosphere, a piston movable in said cylinder, a second piston within said cylinder and adapted on movement thereof to engage one section of said mold, means for imparting rotary movement to said last-mentioned piston, and means for returning said pistons to their initial position.

31. Apparatus for partially shaping the charge of glass in a blank or parison mold comprising opposed plungers, a cylinder in which each of said plungers reciprocates, means for positioning the mold between said plungers, means for introducing actuating fluid into one of said cylinders to move the plunger therein into mold supporting position, and means uncovered by the movement of said mold supporting plunger for delivering actuating fluid from said first mentioned cylinder into the second cylinder to move the plunger therein into said mold to press the charges therein.

32. Apparatus for partially shaping a charge of glass in a blank or parison mold comprising a pair of opposed vertically movable plungers, a cylinder in which each said plunger reciprocates means for positioning the parison mold between said plungers, means for delivering actuating fluid to the lower of said cylinders to move the plunger associated therewith into engagement with said mold to form a support therefor during the pressing operation, means for pneumatically connecting the cylinders together when said lower plunger is in supporting position to move the upper plunger into said mold to press the charge therein, and means carried by the mold supporting plunger for engaging the sides of said mold.

33. Apparatus for partially shaping a charge of glass in a two-part blank or parison mold comprising a pair of opposed vertically movable plungers, means for positioning a parison mold between said molds, pneumatic means for moving the lower plunger into a supporting position beneath said mold, means carried by said lower plunger for locking the parts of said mold together, means for delivering actuating fluid to each pneumatic means, pneumatic means for moving the upper plunger into said mold to preshape the charge therein means controlled by the movement of the lower plunger for delivering actuating fluid to said second pneumatic means, and means associated with said upper plunger for closing the top of the mold during the pressing operation.

34. A forming machine comprising in combination a pair of press tables, a plurality of parison molds carried by each of said press tables, each of said parison molds including a divided lower section and a divided neck ring section, a blow table, a plurality of divided blow molds, carried by said blow table, a blow head for each of said blow molds movable into and out of contact therewith, means for intermittently and alternately rotating each of said press tables to move the parison molds from a charge-receiving position to a pressing station and then to a discharging station, means for rotating said blow tables to alternately position molds at the discharge station of each of said press tables, means controlled by the rotation of said press tables for opening and closing the lower sections of each of the parison molds carried thereby, means for pressing the charge in the parison mold delivered to said pressing stations, means controlled by said press table rotating means for closing the sections of the blow molds positioned at the discharge station of each said press table, means at each discharge station for opening the neck ring sections of each parison mold positioned at such discharge station, means controlled by the neck ring opening means for moving said blow head into contact with said blow molds, means for raising said blow heads as said blow table is rotated, and means controlled by the rotation of said blow table for opening said blow molds to discharge the finished ware.

35. A glassware forming machine comprising in combination a pair of rotatable press tables, a plurality of parison molds carried by each of said press tables, each of said parison molds including a divided lower section and a divided neck ring section, a rotatable blow table, a plurality of divided blow molds carried by said blow table, a blow head for each of said blow molds and movable relative thereto, means for intermittently rotating each of said press tables to move the parison molds successively from a charge-receiving station to a pressing station and then to a discharge station, means for rotating said blow mold table to position a blow mold at the discharge station of each of said press tables, means controlled by the rotation of said press tables for opening the lower sections of each said parison mold at the discharge station and closing such sections prior to being moved to the charge-receiving station, means controlled by said press table rotating means for closing the sections of the blow molds positioned at the discharge station of each said press table, means controlled by the operation of said blow mold closing means for opening the neck ring section of the parison molds positioned at the discharge stations, means controlled by the neck ring opening means for moving a blow head into engagement with said blow molds at the discharge stations, means controlled by the rotation of said blow table for raising said blow heads, and means for opening said blow molds during the rotation of said blow mold table.

36. A glassware forming machine comprising in combination, a pair of rotatable press tables, a plurality of parison molds carried by each of said tables, each of said parison molds including a divided body and a divided neck ring, a rotatable blow mold table, a plurality of divided blow molds carried by said table, a blow head for each of said blow molds and movable relative thereto, means including a Geneva wheel for intermittently rotating each of said press tables to move the parison molds on each table successively from a charge-receiving station to a pressing station and to a discharge station, means including a Geneva wheel for rotating a blow mold table to position a blow mold at the discharge station of each of said press tables, means controlled by the rotation of said press tables for opening the body of each said parison molds at the discharge station and closing such sections prior to their being moved to the charge-receiving station, means controlled by the press table rotating means for closing the sections of the blow mold positioned at the discharge station of each press table, means controlled by the operation of said blow mold closing means for opening the neck ring section of each of the parison molds positioned at the discharge station, means controlled by the neck ring opening means for moving a blow head into engagement with the blow molds at the discharge stations, means controlled by the rotation of said blow table for raising said blow heads, and means for opening said blow molds during the rotation of said blow mold table.

37. A glassware fabricating machine comprising a pair of press mold tables each having a series of blank molds thereon, a blow mold table having a series of blow molds thereon, means for alternately rotating each of said press mold tables, means for rotating said blow mold table in synchronism with the rotation of each of said press mold tables, and means for effecting a transfer from a mold of one press table to a blow mold on said blow table and then for effecting a transfer from the other of said press tables to said blow mold table.

38. A glassware fabricating machine comprising a pair of rotatable press mold tables, a single blow mold table, means for alternately rotating said press mold tables, means for rotating said blow mold table in synchronism with each said press table and a Geneva wheel for controlling the speed of rotation of each said table.

FRANK L. O. WADSWORTH.